US008819220B2

(12) United States Patent
Nagura et al.

(10) Patent No.: US 8,819,220 B2
(45) Date of Patent: Aug. 26, 2014

(54) MANAGEMENT METHOD OF COMPUTER SYSTEM AND MANAGEMENT SYSTEM

(75) Inventors: Masataka Nagura, Yokohama (JP); Takayuki Nagai, Machida (JP); Kiminori Sugauchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 888 days.

(21) Appl. No.: 13/055,440

(22) PCT Filed: Oct. 15, 2010

(86) PCT No.: PCT/JP2010/068130

§ 371 (c)(1), (2), (4) Date: Jan. 21, 2011

(87) PCT Pub. No.: WO2012/032676

PCT Pub. Date: Mar. 15, 2012

(65) Prior Publication Data

US 2012/0066376 A1 Mar. 15, 2012

(30) Foreign Application Priority Data

Sep. 9, 2010 (JP) ................................ 2010-202274

(51) Int. Cl.
*G06F 15/173* (2006.01)
*G06F 11/07* (2006.01)
*H04L 29/06* (2006.01)

(52) U.S. Cl.
CPC .......... *G06F 11/079* (2013.01); *H04L 63/1425* (2013.01); *H04L 63/1416* (2013.01)
USPC .......................................... 709/224; 709/223

(58) Field of Classification Search
CPC ........... H04L 63/1425; H04L 63/1416; G06F 11/079
USPC ................................................ 709/223, 224
See application file for complete search history.

(56) References Cited

U.S. PATENT DOCUMENTS

| | | | | |
|---|---|---|---|---|
| 7,107,185 | B1 | 9/2006 | Yemini et al. | |
| 7,131,037 | B1 * | 10/2006 | LeFaive et al. | 714/46 |
| 8,015,133 | B1 * | 9/2011 | Wu et al. | 706/21 |
| 8,027,264 | B2 * | 9/2011 | Erman et al. | 370/250 |

(Continued)

FOREIGN PATENT DOCUMENTS

| | | |
|---|---|---|
| JP | 03-145846 | 6/1991 |
| JP | 2007-249741 | 9/2007 |

(Continued)

OTHER PUBLICATIONS

U.S. Appl. No. 12/529,522, filed Sep. 1, 2009, Itoh et al.

(Continued)

*Primary Examiner* — Hieu Hoang
(74) *Attorney, Agent, or Firm* — Foley & Lardner LLP

(57) ABSTRACT

To provide a fault analysis result classification function capable of reducing the time required to eliminate a fault in a monitoring target apparatus. The fault analysis results (fault cause candidates) obtained during the fault analysis processing are classified for the influence range of each of the fault cause candidates by analyzing which of the other fault cause candidates relate to the fault events of the apparatus abnormal state, which are used as the basis to derive the each of the fault cause candidates. Further, the classification results are displayed on a GUI.

13 Claims, 19 Drawing Sheets

(56) References Cited

U.S. PATENT DOCUMENTS

| | | | | |
|---|---|---|---|---|
| 8,307,069 | B2 * | 11/2012 | Savo et al. | 709/224 |
| 2004/0225927 | A1 * | 11/2004 | Warpenburg et al. | 714/47 |
| 2007/0217815 | A1 | 9/2007 | Sato et al. | |
| 2007/0283436 | A1 * | 12/2007 | Duffield et al. | 726/23 |
| 2007/0294187 | A1 * | 12/2007 | Scherrer | 705/75 |
| 2008/0295172 | A1 * | 11/2008 | Bohacek | 726/23 |
| 2009/0077663 | A1 * | 3/2009 | Sun et al. | 726/23 |
| 2009/0292789 | A1 | 11/2009 | Nagai et al. | |
| 2009/0300428 | A1 | 12/2009 | Matsumoto et al. | |
| 2009/0313198 | A1 | 12/2009 | Kudo et al. | |
| 2010/0050023 | A1 * | 2/2010 | Scarpelli et al. | 714/46 |
| 2010/0064368 | A1 * | 3/2010 | Stolfo et al. | 726/24 |
| 2010/0325493 | A1 | 12/2010 | Morimura et al. | |
| 2011/0087924 | A1 * | 4/2011 | Kandula et al. | 714/26 |
| 2011/0154097 | A1 * | 6/2011 | Barlow et al. | 714/3 |
| 2011/0167493 | A1 * | 7/2011 | Song et al. | 726/23 |
| 2011/0264812 | A1 * | 10/2011 | Bergman et al. | 709/228 |
| 2013/0317889 | A1 * | 11/2013 | Narayanan et al. | 705/7.37 |
| 2014/0080539 | A1 * | 3/2014 | Scherzer et al. | 455/525 |

FOREIGN PATENT DOCUMENTS

| | | | |
|---|---|---|---|
| JP | 2008-059102 | | 3/2008 |
| WO | WO 2010/109673 | A1 | 9/2010 |
| WO | WO 2010/122604 | A1 | 10/2010 |

OTHER PUBLICATIONS

U.S. Appl. No. 12/664,382, filed Dec. 11, 2009, Morimura et al.
U.S. Appl. No. 12/664,310, filed Dec. 11, 2009, Kunii et al.
U.S. Appl. No. 12/812,708, filed Jul. 13, 2010, Nagai et al.
U.S. Appl. No. 12/745,212, filed May 27, 2010, Morimura et al.
U.S. Appl. No. 12/933,547, filed Sep. 20, 2010, Fukuda et al.
U.S. Appl. No. 12/995,133, filed Nov. 29, 2010, Nagai et al.
PCT International Search Report and Written Opinion on application No. PCT/JP2010/068130 mailed Jan. 11, 2011.

* cited by examiner

| Apparatus ID | Device ID | Metric | Apparatus OS | Performance value | Alert execution threshold | Threshold class | Status |
|---|---|---|---|---|---|---|---|
| SYS1 | CTL1 | Operation rate | - | 40(%) | 20(%) | Upper limit | Abnormal relative to threshold |
| SYS1 | CTL2 | Operation rate | - | 60(%) | 80(%) | Upper limit | Normal |
| SYS1 | LU1 | I/O amount per unit time | - | 300(IOPS) | 1000 (IOPS) | Upper limit | Normal |
| SYS1 | LU2 | I/O amount per unit time | - | 400(IOPS) | 1000 (IOPS) | Upper limit | Normal |
| HOST1 | /var | Response time | Linux | 5(msec) | 10(msec) | Upper limit | Normal |
| HOST1 | /opt | Response time | Linux | 5(msec) | 10(msec) | Upper limit | Normal |
| HOST2 | E: | Response time | Windows | 5(msec) | 10(msec) | Upper limit | Normal |
| HOST3 | E: | Response time | Windows | 15(msec) | 10(msec) | Upper limit | Normal |
| : | : | : | : | : | : | : | : |

| Apparatus ID (33210) | Volume ID (33220) | LU number (33230) | Controller name (33240) | Connection destination host ID (33250) | Connection destination drive name (33260) |
|---|---|---|---|---|---|
| SYS1 | VOL1 | LU1 | CTL1 | HOST1 | /var |
| | VOL1 | LU1 | CTL2 | HOST1 | /opt |
| | VOL2 | LU2 | CTL3 | HOST2 | E: |
| | VOL5 | LU3 | CTL4 | HOST3 | E: |
| : | : | : | : | : | : |

| Event ID | Apparatus ID | Apparatus portion ID | Metric | Apparatus OS | Status | Analysis completion flag | Generation date and time |
|---|---|---|---|---|---|---|---|
| EV1 | SYS1 | CTL1 | Operation rate | - | Abnormal relative to threshold | No | 2010-01-01 15:05:00 |
| EV2 | SYS1 | CTL3 | Operation rate | - | Abnormal relative to threshold | No | 2010-01-01 15:00:00 |
| EV3 | SYS1 | LU1 | I/O amount per unit time | - | Abnormal relative to threshold | No | 2010-01-01 15:05:00 |
| EV4 | SYS1 | LU2 | I/O amount per unit time | - | Abnormal relative to threshold | No | 2010-01-01 15:00:00 |
| EV5 | SYS1 | LU3 | I/O amount per unit time | - | Abnormal relative to threshold | No | 2010-01-01 15:05:00 |
| EV6 | HOST1 | /var | Response time | Linux | Abnormal relative to threshold | No | 2010-01-01 15:05:00 |
| EV7 | HOST1 | /opt | Response time | Linux | Abnormal relative to threshold | No | 2010-01-01 15:05:00 |
| EV8 | HOST2 | E: | Response time | Windows | Abnormal relative to threshold | No | 2010-01-01 15:00:00 |
| EV9 | HOST3 | E: | Response time | Windows | Abnormal relative to threshold | No | 2010-01-01 15:05:00 |
| : | : | : | : | : | : | : | : |

| | | Apparatus class | Apparatus portion class | Metric | Status |
|---|---|---|---|---|---|
| 33410 | Condition portion | Host computer | Drive | Response time | Abnormal relative to threshold |
| | | Storage apparatus | Controller | Operation rate | Abnormal relative to threshold |
| | | Storage apparatus | LU | I/O amount per unit time | Abnormal relative to threshold |
| 33420 | Conclusion portion | Storage apparatus | Controller | Operation rate | Bottleneck |
| 33430 | General-purpose rule ID | Rule1 | | | |
| 33440 | Application topology | Volume topology management table | | | |

| | | Apparatus class | Apparatus portion class | Metric | Status |
|---|---|---|---|---|---|
| 33410 | Condition portion | Host computer | Drive | Response time | Abnormal relative to threshold |
| | | Storage apparatus | Controller | Operation rate | Normal |
| | | Storage apparatus | LU | I/O amount per unit time | Normal |
| 33420 | Conclusion portion | IP switch | - | I/O amount per unit time | Bottleneck |
| 33430 | General-purpose rule ID | Rule2 | | | |
| 33440 | Application topology | Volume topology management table | | | |

| | | Apparatus ID | Apparatus portion ID | Metric | Status |
|---|---|---|---|---|---|
| 33510 | Condition portion | HOST1 | /var | Response time | Abnormal relative to threshold |
| | | SYS1 | CTL1 | Operation rate | Abnormal relative to threshold |
| | | SYS1 | LU1 | I/O amount per unit time | Abnormal relative to threshold |
| 33520 | Conclusion portion | SYS1 | CTL1 | Operation rate | Bottleneck |
| 33530 | Expansion rule ID | ExRule1-1 | | | |
| 33540 | General-purpose rule ID before expansion | Rule-1 | | | |

| | | Apparatus ID | Apparatus portion ID | Metric | Status |
|---|---|---|---|---|---|
| 33510 | Condition portion | HOST1 | /opt | Response time | Abnormal relative to threshold |
| | | SYS1 | CTL2 | Operation rate | Abnormal relative to threshold |
| | | SYS1 | LU1 | I/O amount per unit time | Abnormal relative to threshold |
| 33520 | Conclusion portion | SYS1 | CTL2 | Operation rate | Bottleneck |
| 33530 | Expansion rule ID | ExRule1-2 | | | |
| 33540 | General-purpose rule ID before expansion | Rule-1 | | | |

| | | Apparatus ID | Apparatus portion ID | Metric | Status |
|---|---|---|---|---|---|
| 33510 | Condition portion | HOST2 | E: | Response time | Abnormal relative to threshold |
| | | SYS1 | CTL3 | Operation rate | Abnormal relative to threshold |
| | | SYS1 | LU2 | I/O amount per unit time | Abnormal relative to threshold |
| 33520 | Conclusion portion | SYS1 | CTL3 | Operation rate | Bottleneck |
| 33530 | Expansion rule ID | ExRule1-3 | | | |
| 33540 | General-purpose rule ID before expansion | Rule-1 | | | |

| | | Apparatus ID | Apparatus portion ID | Metric | Status |
|---|---|---|---|---|---|
| 33510 | Condition portion | HOST3 | E: | Response time | Abnormal relative to threshold |
| | | SYS1 | CTL4 | Operation rate | Abnormal relative to threshold |
| | | SYS1 | LU3 | I/O amount per unit time | Abnormal relative to threshold |
| 33520 | Conclusion portion | SYS1 | CTL4 | Operation rate | Bottleneck |
| 33530 | Expansion rule ID | ExRule1-4 | | | |
| 33540 | General-purpose rule ID before expansion | Rule-1 | | | |

| | Apparatus ID | Apparatus portion ID | Metric | Status |
|---|---|---|---|---|
| 33510 Condition portion | HOST1 | /var | Response time | Abnormal relative to threshold |
| | SYS1 | CTL1 | Operation rate | Normal |
| | SYS1 | LU1 | I/O amount per unit time | Normal |
| 33520 Conclusion portion | IPSW1 | — | I/O amount per unit time | Bottleneck |
| 33530 Expansion rule ID | ExRule2-1 | | | |
| 33540 General-purpose rule ID before expansion | Rule-2 | | | |

| | Apparatus ID | Apparatus portion ID | Metric | Status |
|---|---|---|---|---|
| 33510 Condition portion | HOST1 | /opt | Response time | Abnormal relative to threshold |
| | SYS1 | CTL2 | Operation rate | Normal |
| | SYS1 | LU1 | I/O amount per unit time | Normal |
| 33520 Conclusion portion | IPSW1 | — | I/O amount per unit time | Bottleneck |
| 33530 Expansion rule ID | ExRule2-2 | | | |
| 33540 General-purpose rule ID before expansion | Rule-2 | | | |

| | | Apparatus ID | Apparatus portion ID | Metric | Status |
|---|---|---|---|---|---|
| 33510 | Condition portion | HOST2 | E: | Response time | Abnormal relative to threshold |
| | | SYS1 | CTL3 | Operation rate | Normal |
| | | SYS1 | LU2 | I/O amount per unit time | Normal |
| 33520 | Conclusion portion | IPSW1 | — | I/O amount per unit time | Bottleneck |
| 33530 | Expansion rule ID | ExRule2-3 | | | |
| 33540 | General-purpose rule ID before expansion | Rule-2 | | | |

| | | Apparatus ID | Apparatus portion ID | Metric | Status |
|---|---|---|---|---|---|
| 33510 | Condition portion | HOST3 | E: | Response time | Abnormal relative to threshold |
| | | SYS1 | CTL4 | Operation rate | Normal |
| | | SYS1 | LU3 | I/O amount per unit time | Normal |
| 33520 | Conclusion portion | IPSW1 | — | I/O amount per unit time | Bottleneck |
| 33530 | Expansion rule ID | ExRule2-4 | | | |
| 33540 | General-purpose rule ID before expansion | Rule-2 | | | |

| Cause apparatus ID (33610) | Cause portion ID (33620) | Metric (33630) | Confidence value (33640) | Expansion rule ID (33650) | Reception event ID (33660) | Handling completion flag (33670) | Group ID (33680) | Classification start-point flag (33690) | Analysis execution date and time (33695) |
|---|---|---|---|---|---|---|---|---|---|
| SYS1 | CTL1 | Operation rate | 3/3 | ExRule1-1 | EV1<br>EV3<br>EV6 | No | - | - | 2010-01-01 15:05:00 |
| SYS1 | CTL2 | Operation rate | 2/3 | ExRule1-2 | EV3<br>EV7 | No | - | - | 2010-01-01 15:05:00 |
| SYS1 | CTL3 | Operation rate | 3/3 | ExRule1-3 | EV2<br>EV4<br>EV8 | No | - | - | 2010-01-01 15:00:00 |
| SYS1 | CTL4 | Operation rate | 2/3 | ExRule1-4 | EV5<br>EV9 | No | - | - | 2010-01-01 15:05:00 |
| IP SW1 | - | I/O amount per unit time | 4/12 | ExRule2-1<br>ExRule2-2<br>ExRule2-3<br>ExRule2-4 | EV6<br>EV7<br>EV8<br>EV9 | No | - | - | 2010-01-01 15:05:00 |
| : | : | : | : | : | : | : | : | : | : |

Figure 14:
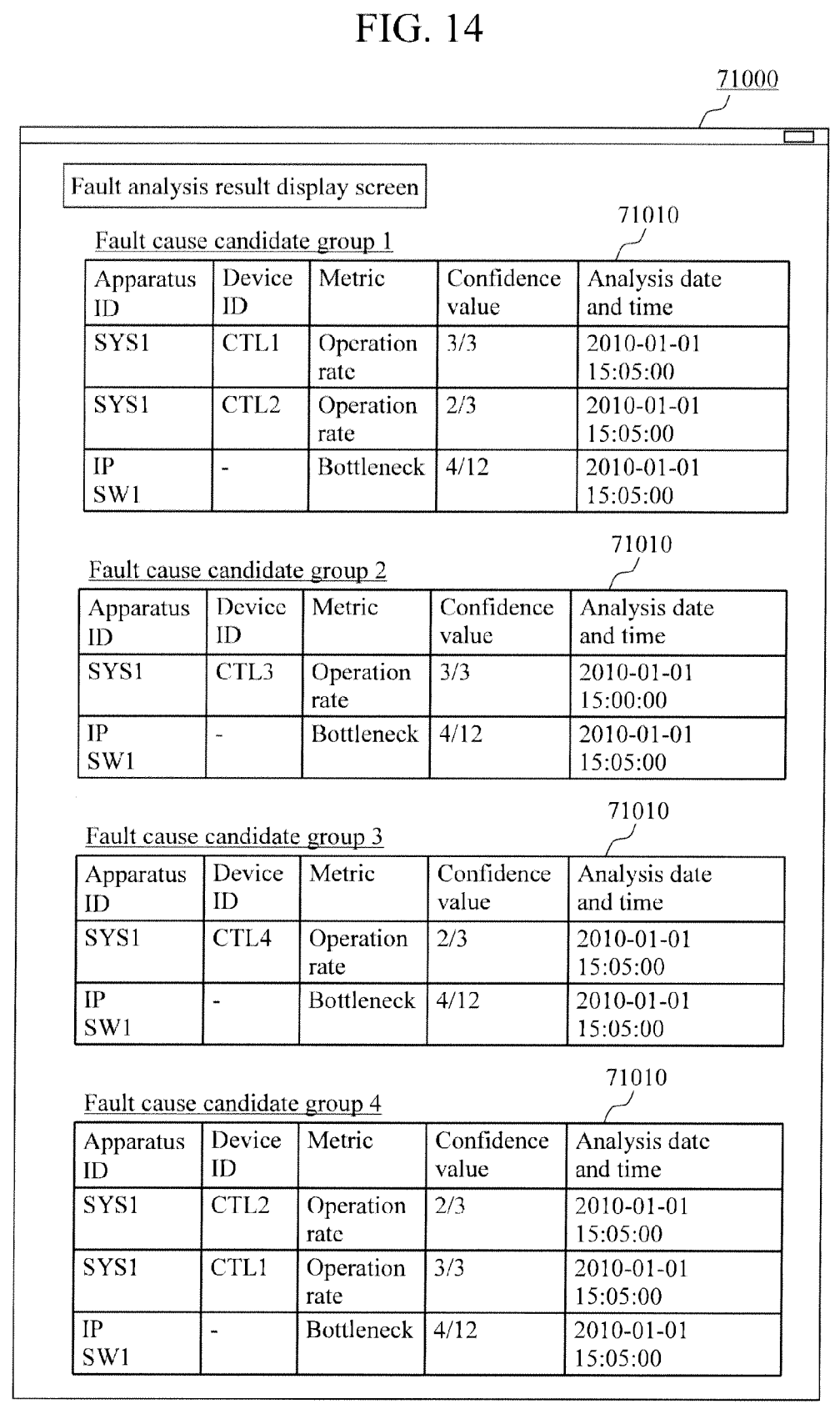

Fault analysis result display screen

71010

Fault cause candidate group 1

| Apparatus ID | Device ID | Metric | Confidence value | Analysis date and time |
|---|---|---|---|---|
| SYS1 | CTL1 | Operation rate | 3/3 | 2010-01-01 15:05:00 |
| SYS1 | CTL2 | Operation rate | 2/3 | 2010-01-01 15:05:00 |
| IP SW1 | - | Bottleneck | 4/12 | 2010-01-01 15:05:00 |

71010

Fault cause candidate group 2

| Apparatus ID | Device ID | Metric | Confidence value | Analysis date and time |
|---|---|---|---|---|
| SYS1 | CTL3 | Operation rate | 3/3 | 2010-01-01 15:00:00 |
| IP SW1 | - | Bottleneck | 4/12 | 2010-01-01 15:05:00 |

71010

Fault cause candidate group 3

| Apparatus ID | Device ID | Metric | Confidence value | Analysis date and time |
|---|---|---|---|---|
| SYS1 | CTL4 | Operation rate | 2/3 | 2010-01-01 15:05:00 |
| IP SW1 | - | Bottleneck | 4/12 | 2010-01-01 15:05:00 |

71010

Fault cause candidate group 4

| Apparatus ID | Device ID | Metric | Confidence value | Analysis date and time |
|---|---|---|---|---|
| SYS1 | CTL2 | Operation rate | 2/3 | 2010-01-01 15:05:00 |
| SYS1 | CTL1 | Operation rate | 3/3 | 2010-01-01 15:05:00 |
| IP SW1 | - | Bottleneck | 4/12 | 2010-01-01 15:05:00 |

Figure 17:
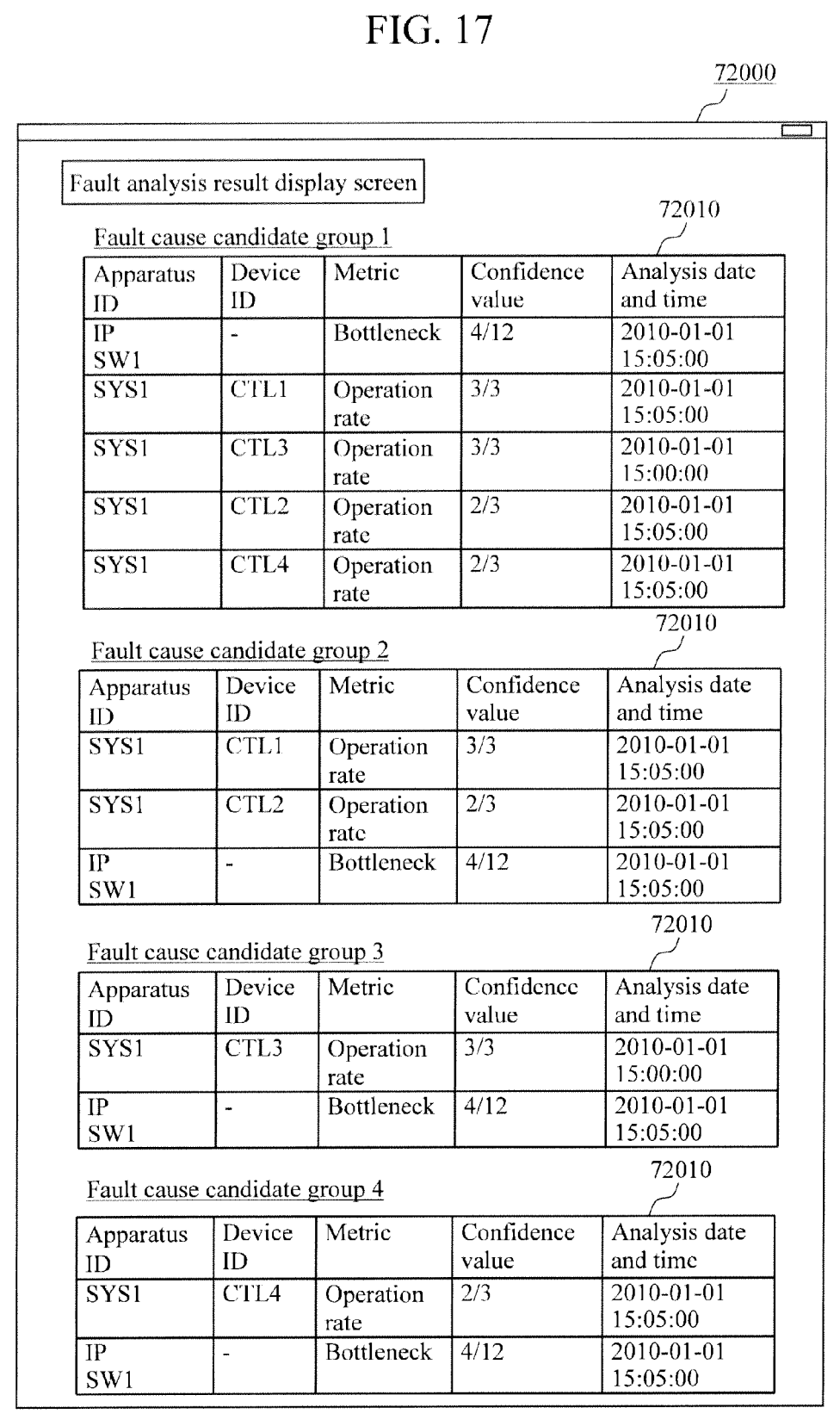

Fault analysis result display screen

72010

Fault cause candidate group 1

| Apparatus ID | Device ID | Metric | Confidence value | Analysis date and time |
|---|---|---|---|---|
| IP SW1 | - | Bottleneck | 4/12 | 2010-01-01 15:05:00 |
| SYS1 | CTL1 | Operation rate | 3/3 | 2010-01-01 15:05:00 |
| SYS1 | CTL3 | Operation rate | 3/3 | 2010-01-01 15:00:00 |
| SYS1 | CTL2 | Operation rate | 2/3 | 2010-01-01 15:05:00 |
| SYS1 | CTL4 | Operation rate | 2/3 | 2010-01-01 15:05:00 |

72010

Fault cause candidate group 2

| Apparatus ID | Device ID | Metric | Confidence value | Analysis date and time |
|---|---|---|---|---|
| SYS1 | CTL1 | Operation rate | 3/3 | 2010-01-01 15:05:00 |
| SYS1 | CTL2 | Operation rate | 2/3 | 2010-01-01 15:05:00 |
| IP SW1 | - | Bottleneck | 4/12 | 2010-01-01 15:05:00 |

72010

Fault cause candidate group 3

| Apparatus ID | Device ID | Metric | Confidence value | Analysis date and time |
|---|---|---|---|---|
| SYS1 | CTL3 | Operation rate | 3/3 | 2010-01-01 15:00:00 |
| IP SW1 | - | Bottleneck | 4/12 | 2010-01-01 15:05:00 |

72010

Fault cause candidate group 4

| Apparatus ID | Device ID | Metric | Confidence value | Analysis date and time |
|---|---|---|---|---|
| SYS1 | CTL4 | Operation rate | 2/3 | 2010-01-01 15:05:00 |
| IP SW1 | - | Bottleneck | 4/12 | 2010-01-01 15:05:00 |

MANAGEMENT METHOD OF COMPUTER SYSTEM AND MANAGEMENT SYSTEM

CROSS-REFERENCE TO RELATED APPLICATIONS

The present application is a national phase application of International Application No. PCT/JP2010/068130 filed on Oct. 15, 2010 and claims priority from Japanese application No. 2010-202274 filed on Sep. 9, 2010, the content of which are hereby incorporated by reference into this application.

TECHNICAL FIELD

The present invention relates to a management method of a computer system and to a management system. For example, the present invention relates to a technique for managing faults of a host computer, a network switch, and a storage system which configure a computer system.

BACKGROUND ART

When a computer system is managed, for example, as shown in Patent Literature 1, a cause event (event) is detected from a plurality of faults or signs of the faults, which are detected in the system. More specifically, in Patent Literature 1, management software is used to detect, as an event, an excess of performance value relative to a threshold in an apparatus under management, and accumulates the event in an event DB.

Further, the management software has an analysis engine for analyzing a causal relationship between a plurality of fault events generated in the apparatus under management. The analysis engine accesses a configuration DB having inventory information on the apparatus under management, to recognize components in the apparatus which are connected to I/O channel paths, and recognizes, as one group referred to as "topology", the components which can affect the performance of a logical volume on the host. When an event is generated, the analysis engine applies an analysis rule, consisting of a predetermined condition sentence and analysis result, to the each topology, so as to construct an expanded rule. The expanded rule includes a cause event, which is a cause of performance degradation in the other apparatus, and a group of related events caused by the cause event. Specifically, an event described as a cause of a fault in the "THEN" portion of the rule is the cause event, and events other than the cause event, which are described in the "IF" portion of the rule, are the related events.

CITATION LIST

Patent Literature

Patent Literature 1: U.S. Pat. No. 7,107,185

SUMMARY OF INVENTION

Technical Problem

In the fault analysis function described in Patent Literature 1, a combination of the events received from a management target apparatus and a cause candidate of a fault are described as a rule of the IF-THEN form. The fault analysis function calculates the generation ratio of the event described in the IF portion of the rule and thereby calculates the confidence value of the fault cause candidate described in the Then portion. The calculated confidence value and the fault cause candidate are displayed on a GUI according to the user's request.

However, in such conventional fault analysis function, when faults occur frequently in a short period, the number of the stored fault analysis results is increased, and hence the manager may not be able to determine which of the faults is to be actually handled. For this reason, it takes a long time to eliminate the fault in the monitoring target apparatus and thereby the situation may become more serious.

The present invention has been made in view of the above described circumstances. An object of the present invention is to provide a function to reduce the time to eliminate a fault in a monitoring target apparatus.

Solution to Problem

To this end, according to the present invention, after the fault cause analysis processing, the obtained cause candidates are classified on the basis of the influence range of each of the cause candidates. The cause candidates are classified into groups on the basis of the fault events related to the cause candidates, and the groups are individually displayed on the GUI. More specifically, when a group of cause candidates are first inferred as a result of the fault cause analysis, the cause candidates are classified into groups each of which is based on the same apparatus abnormal state. Further, the group of the cause candidates derived from the same apparatus abnormal state is regarded and classified as a group of cause candidates for solving the same fault, and the classified groups are respectively displayed on the GUI.

That is, according to the present invention, a management system acquires a processing performance value representing the processing performance of a node apparatus, and detects the generation of a fault in the node apparatus on the basis of the acquired processing performance value. Then, the management system applies the detected fault to an analysis rule representing a relationship of a combinations of one or more condition events capable of occurring in the node apparatus with a conclusion event set as a fault cause of the combination of the condition events, so as to calculate a confidence value which is the information representing the possibility of the occurrence of the fault in the node apparatus. Further, the management system selects, as a start-point cause candidate, one of the conclusion events set as a plurality of fault causes, and then extracts condition events relating to the start-point cause candidate. Further, the management system selects, as a related cause candidate, the conclusion event which relates to the extracted condition events, and which is different from the conclusion event of the start-point cause candidate and set as one or more fault causes. Then, the management system performs classification processing of the conclusion event of the start-point cause candidate and the conclusion event of the related cause candidate separately from the other conclusion events. The classified conclusion events are displayed on the screen of the GUI.

Further features of the present invention will become apparent from the following description of exemplary embodiments with reference to the accompanying drawings.

Advantageous Effects of Invention

According to the present invention, when the result of fault analysis is presented to the manager (user), the inferred fault cause candidates are classified based on the fault events related to the faults which are solved by handling the inferred fault cause candidates. Thereby, the manager can easily determine priority in handling the analysis result, so that the load required in checking the analysis result and handling the fault can be reduced.

BRIEF DESCRIPTION OF THE DRAWINGS

FIG. 5 shows a configuration example of an apparatus performance management table provided in the management server.

FIG. 6 shows a configuration example of a volume topology management table provided in the management server.

FIG. 7 shows a configuration example of an event management table stored in the management server.

FIG. 8A shows a configuration example (1) of a general-purpose rule stored in the management server.

FIG. 8B shows a configuration example (2) of the general-purpose rule stored in the management server.

FIG. 9A shows a configuration example (1) of an expanded rule stored in the management server.

FIG. 9B shows a configuration example (2) of an expanded rule stored in the management server.

FIG. 9C shows a configuration example (3) of an expanded rule stored in the management server.

FIG. 9D shows a configuration example (4) of an expanded rule stored in the management server.

FIG. 9E shows a configuration example (5) of an expanded rule stored in the management server.

FIG. 9F shows a configuration example (6) of an expanded rule stored in the management server.

FIG. 9G shows a configuration example (7) of an expanded rule stored in the management server.

FIG. 9H shows a configuration example (8) of an expanded rule stored in the management server.

FIG. 10 shows a configuration example of an analysis result management table stored in the management server.

FIG. 14 shows a configuration example of a fault analysis result screen displayed by the management server in the first embodiment.

FIG. 17 shows a configuration example of a fault analysis result screen displayed by the management server in the second embodiment.

BEST MODE FOR CARRYING OUT THE INVENTION

Figure 1:
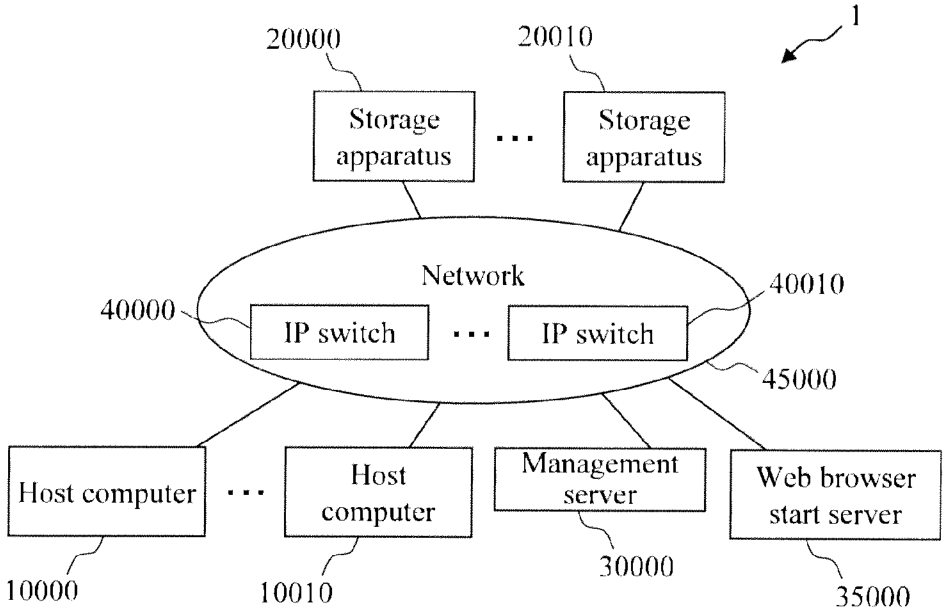
FIG. 1 shows an example of a physical configuration of a computer system.

Embodiments according to the present invention relate to fault cause analysis for eliminating a fault in an IT system. As described above, even the prior art is configured such that cause candidates of a fault are presented to the manager so as to enable the manager to handle the fault. However, in the case where many cause candidates are generated due to a plurality of fault causes, when it is not known which of the cause candidates is related to which of the fault causes is actually generated, it is not possible to efficiently handle the fault. For example, even when, based on the confidence values of the fault cause candidates, the several cause candidates with higher confidence values are handled, the cause candidates may be derived in practice from a fault generated in the same apparatus. Further, when a fault is generated in the other apparatus and when the fault cause candidate due to the fault is presented with low priority, it is necessary to handle the cause candidate similarly to the some cause candidates with higher priority. However, the software configured to execute the fault cause analysis does not provide a method for, when many cause candidates are generated due to a plurality of fault causes, classifying the cause candidates into groups according to the influence range of each of the cause candidates. For this reason, it is difficult for the manager to determine which of the cause candidates is to be preferentially handled. That is, the conventional fault analysis result does not provide the information representing which of the fault cause candidates is related to which of the fault causes is actually generated. Thereby, the time until the manager refers to the analysis result representing the fault cause candidate to be preferentially handled, so that the time required to eliminate the fault eventually becomes long.

Thus, the following embodiments according to the present invention are configured to provide a function to more reliably present a cause candidate to be preferentially handled.

In the following, embodiments according to the present invention will be described with reference to the accompanying drawings. However, it should be noted that each of the present embodiments is only an example for implementing the present invention and does not limit the technical scope of the present invention. Further, in each of the figures, the same components are denoted by the same reference numerals and characters.

Note that in this specification, the information used in the present invention is represented by an expression of "aaa table," but the information may be represented by expressions, such as "aaa list," "aaa DB" and "aaa queue" and may also be represented by forms other than the data structures, such as a table, a list, a DB, a queue. For this reason, "aaa table," "aaa chart," "aaa list," "aaa DB," "aaa queue" and the like, may be referred to as "aaa information" in order to indicate that the information used in the present invention does not depend on the data structure.

Further, when the contents of each information are described, expressions, such as "identification information," "identifier," "name," "appellation" and "ID" are used, but these can be substituted for each other.

Further, in the following description of a processing operation according to the present invention, there is a case where the description is made by using a "program" and a "module" as an operation subject (subject). However, the program and the module are executed by a processor and thereby perform defined processing by using a memory and a communication port (communication controller). Thus, the processing may be read as the processing performed by the processor as the operation subject (subject). Further, the processing, which is disclosed to use the program and the module as the subject, may be read as the processing performed by a computer, such as a management server, and by an information processing apparatus. A part of or all of the program may be realized by dedicated hardware. Further, various programs may be installed in each computer by a program distribution server and storage media.

Further, the scale of the system set as the management target is not referred to in the embodiments described in this specification. However, as the scale of the system is increased, the possibility that faults simultaneously occur in a plurality of places is increased. Therefore, when the present invention is applied to a large scale system, it is possible to obtain a more enhanced effect of the present invention.

(1) First Embodiment

A first embodiment relates to fault cause candidate display processing based on management software (stored, for example, in a management server).

<System Configuration>

FIG. 1 shows a physical configuration of a computer system according to the present invention. The computer system 1 includes a storage apparatus 20000, a host computer 10000, a management server 30000, a WEB browser start server 35000, and an IP switch 40000, and is configured by connecting these apparatuses to each other by a network 45000.

The host computers 10000 to 10010 receive a file I/O request from a client computer (not shown) connected to the host computers, and realize an access to the storage apparatuses 20000 to 20010 on the basis of the file I/O request. Further, the management server (management computer) 30000 manages the operation of the computer system as a whole.

The WEB browser start server 35000 performs communication with a GUI display processing module 32400 of the management server 30000 via the network 45000, and displays various kinds of information on the WEB browser. A user manages the apparatuses in the computer system by referring to the information displayed on the WEB browser on the WEB browser start server. However, the management server 30000 and the WEB browser start server 35000 may be configured by one server.

<Internal Configuration of Host Computer>

Figure 2:
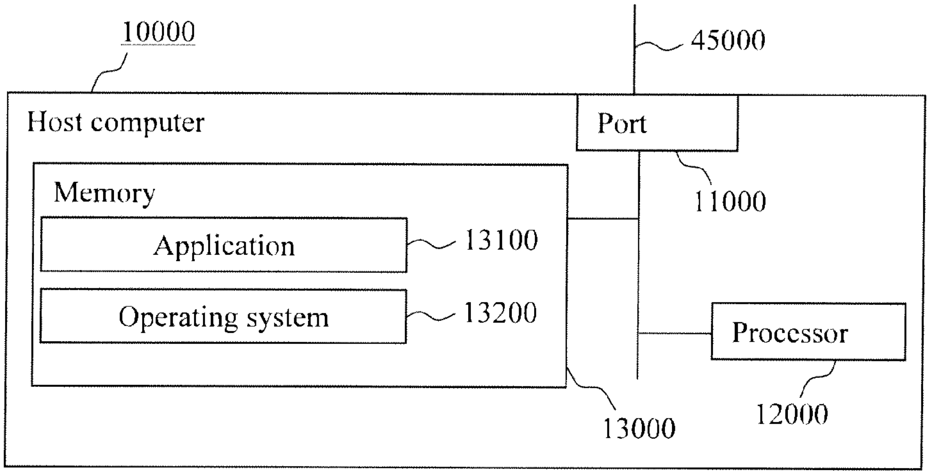
FIG. 2 shows an example of a detailed configuration of a host computer.

FIG. 2 shows an example of a detailed internal configuration of the host computer 10000 according to the present invention. The host computer 10000 includes a port 11000 for connecting the host computer 10000 to the network 45000, a processor 12000, and a memory 13000 (in which a disk apparatus may be included), and is configured by connecting these to each other via a circuit, such as an internal bus.

A business application 13100 and an operating system 13200 are stored in the memory 13000.

The business application 13100 uses a storage area provided by the operating system 13200 and performs data input and output (hereinafter referred to as I/O) to and from the storage area.

The operating system 13200 performs processing for making the business application 13100 recognize, as a storage area, a logical volume on the storage apparatuses 20000 to 20010 connected to the host computer 10000 via the network 45000.

In FIG. 2, the port 11000 is represented as a single port which includes an I/O port used to perform communication with the storage apparatus 20000 on the basis of the iSCSI, and a management port used by the management server 30000 to acquire management information in the host computers 10000 to 10010. However, the port 11000 may be divided into the I/O port used to perform communication based on the iSCSI and the management port.

<Internal Configuration of Storage Apparatus>

Figure 3:
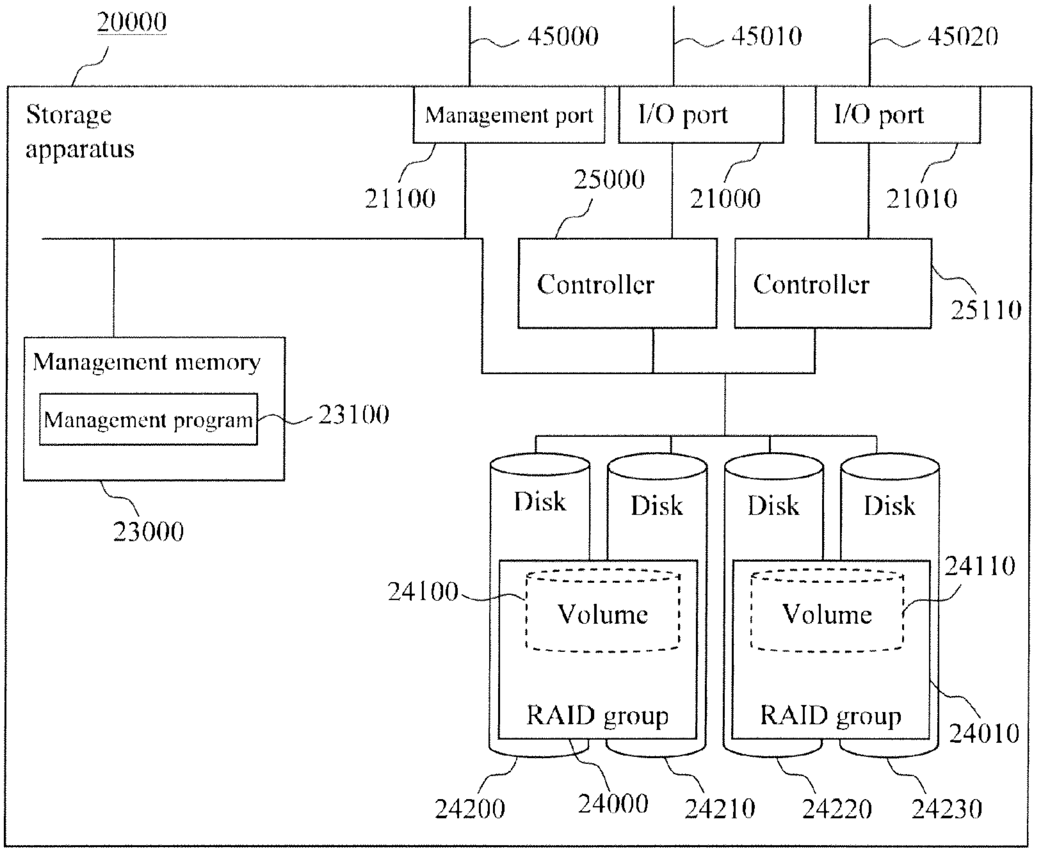
FIG. 3 shows an example of a detailed configuration of a storage apparatus.

FIG. 3 shows an example of a detailed internal configuration of the storage apparatus 20000 according to the present invention. The storage apparatus 20010 also has the same configuration.

The storage apparatus 20000 includes I/O ports 21000 and 21010 for connecting the storage apparatus 20000 to the host computer 10000 via the network 45000, a management port 21100 for connecting the storage apparatus 20000 to the management server 30000 via the network 45000, a management memory 23000 for storing various kinds of management information, RAID groups 24000 to 24010 for storing data, and controllers 25000 and 25010 for controlling data and management information in the management memory, and is configured by connecting these to each other via a circuit, such as an internal bus. Note that the connection of the RAID groups 24000 to 24010 more specifically means that the storage devices configuring the RAID groups 24000 to 24010 are connected to the other components.

The management memory 23000 stores a management program 23100 of the storage apparatus. The management program 23100 communicates with the management server 30000 via the management port 21100, and provides the configuration information on the storage apparatus 20000 to the management server 30000.

The RAID groups 24000 to 24010 are configured by one or more magnetic disks 24200, 24210, 24220, and 24230, respectively. In the case where the storage apparatus is configured by a plurality of magnetic disks, the magnetic disks may be organized into the RAID configuration. Further, the RAID groups 24000 to 24010 are logically divided into a plurality of volumes 24100 to 24110.

Note that as long as the logical volumes 24100 and 24110 are configured by using the storage area of one or more magnetic disks, the magnetic disks do not need to be organized into the RAID configuration. Further, as long as a storage area corresponding to the logical volume can be provided, a storage device using the other storage medium, such as flash memory, may also be used as a substitute of the magnetic disk.

Each of the controllers 25000 and 25010 includes therein a processor which performs control in the storage apparatus 20000, and a cache memory which temporarily stores data that are exchanged with the host computer 10000. Also, each of the controllers is provided between the I/O port and the RAID group, so as to perform data transfer between the I/O port and the RAID group.

Note that the storage apparatus 20000 may have a configuration other than the above described configuration in FIG. 3, as long as the storage apparatus 20000 includes the above described storage device which provides a storage area, and the storage controller which provides a logical volume to any one of the host computers, which receives an access request (indicating an I/O request), and which performs a writing operation to the storage device according to the received access request. For example, the storage apparatus 20000 may be configured such that the storage controller and the storage device providing the storage area are housed in separate cases, respectively. That is, in the example shown in FIG. 3, the management memory 23000, and the controllers 25000 and 25110 are respectively provided to be separated from each other, but may also be integrally configured as a storage controller. Further, in this specification, as a substitute expression in the case where the storage controller and the storage device are included in the same housing, or respectively included in different housings, the storage apparatus may be referred to as a storage system.

<Internal Configuration of Management Server>

Figure 4:
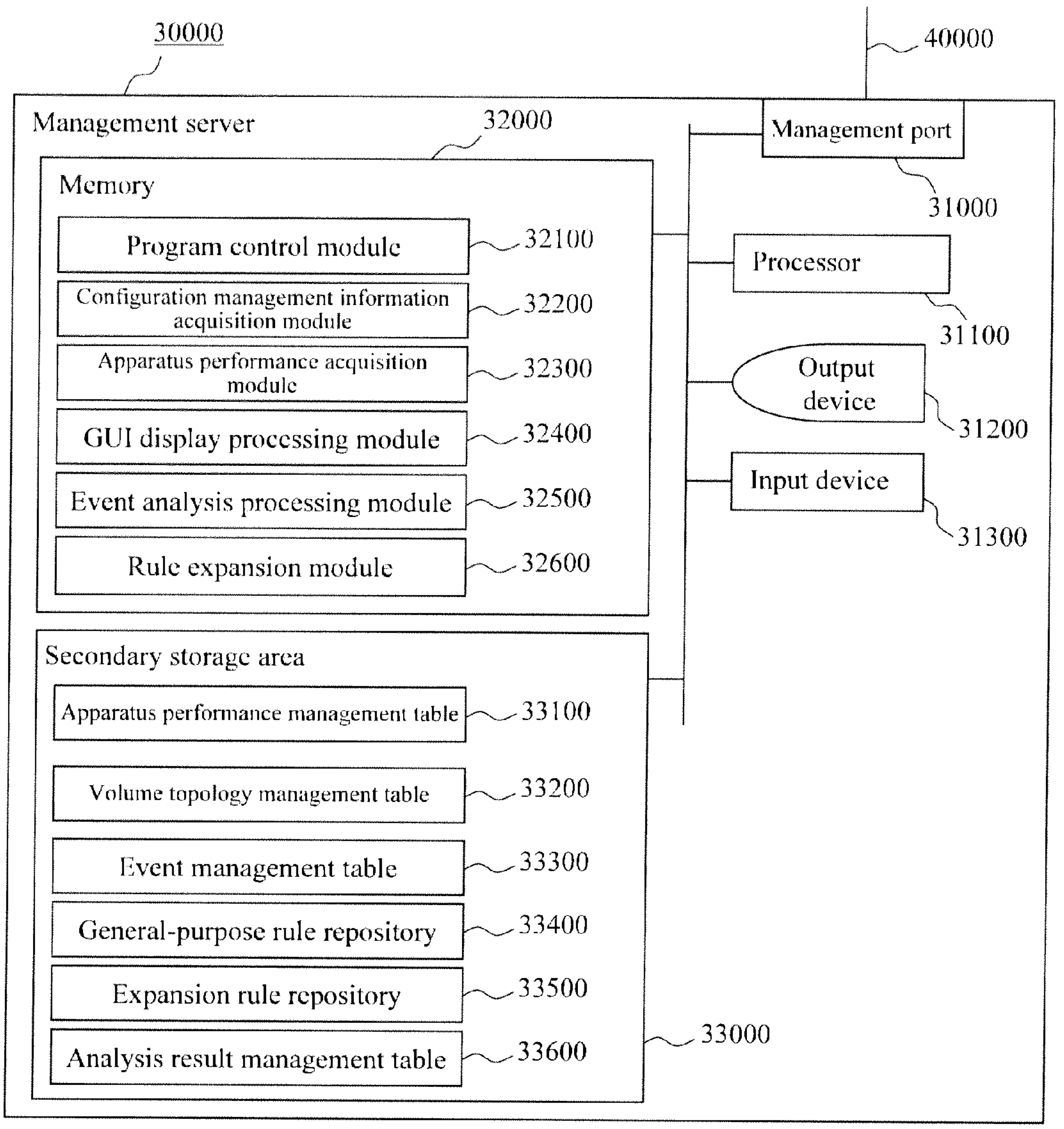
FIG. 4 shows an example of a detailed configuration of a management server.

FIG. 4 is a diagram showing an example of a detailed internal configuration of the management server 30000 according to the present invention. The management server 30000 includes a management port 31000 for connecting the management server 30000 to the network 45000, a processor 31100, a memory 32000, such as a cache memory, a secondary memory (secondary storage area) 33000, an output device 31200, such as a display device, for outputting a processing result as will be described below, and an input device 31300, such as a keyboard, used by a storage manager to input an instruction, and is configured by connecting these to each other via a circuit, such as an internal bus.

The memory 32000 stores a program control module 32100, a configuration management information acquisition module 32200, a apparatus performance acquisition module 32300, the GUI display processing module 32400, an event analysis processing module 32500, and a rule expansion module 32600. Note that in FIG. 4, each of the modules is provided as a software module in the memory 32000, but may also be provided as a hardware module. Further, the processing performed by each of the modules may be provided as one or more program codes, and a clear boundary between the modules does not need to be provided. A module may be read as a program.

The secondary storage area 33000 stores an apparatus performance management table 33100, a volume topology management table 33200, an event management table 33300, a general rule repository 33400, an expanded rule repository 33500, and an analysis result management table 33600. Note that the secondary storage area 33000 is configured by one of the semiconductor memory and the magnetic disk, or by both of the semiconductor memory and the magnetic disk.

The GUI display processing module 32400 displays acquired configuration management information via the output device 31200 according to a request received from the manager through the input device 31300. Note that the input device and the output device may be devices different from each other, or may also be one or more integrated devices.

Note that the management server (management computer) 30000, for example, includes a keyboard, a pointer device, and the like, as the input device 31300, and includes a display, a printer, and the like, as the output device 31200. However, the management server 30000 may be an apparatus having the other configuration. Further, the input and display operations performed by the input and output devices may be substituted in such a manner that a serial interface or an Ethernet interface is used as a substitute of the input and output devices, so as to be connected to a display computer having a display, a keyboard, or a pointer device, and that the transmission of display information to the display computer and the reception of input information from the display computer are performed so as to enable the display computer to perform the display and input reception operations.

In this specification, a group of one or more computers, which manage a computer system (information processing system) 1 and which display the display information, may be referred to as a management system. When the management server 30000 displays the display information, the management server 30000 is the management system, and a combination of the management server 30000 and the display computer (for example, the WEB browser start server 35000 shown in FIG. 1) is also the management system. Further, the processing equivalent to the processing performed by the management server may also be realized by a plurality of computers in order to improve the processing speed and reliability of the management processing. In this case, the plurality of computers (including a display computer in the case where the display operation is performed by the display computer) serve as the management system.

<Configuration of Apparatus Performance Management Table>

FIG. 5 shows a configuration example of the apparatus performance management table 33100 provided in the management server 30000.

The apparatus performance management table 33100 includes, as configuration items, a field 33110 for registering an apparatus ID used as an identifier of a management target apparatus, a field 33120 for registering a device ID used as an identifier of a device in the management target apparatus, a field 33130 for storing a metric name of performance information of the management target device, a field 33140 for storing OS type of an apparatus in which an abnormality is detected based on a threshold (which is determined as abnormal based on the threshold), a field 33150 for receiving the performance value of the management target device from the management target device and storing the performance value, a field 33160 for storing, upon reception of an input from the user, a threshold (alert execution threshold) which is an upper or lower limit of the normal range of the performance value of the management target device, a field 33170 for registering whether the threshold is the upper or lower limit of the normal value, and a field 33180 for registering whether the performance value is a normal value or an abnormal value.

For example, it can be seen from the first row (first entry) of FIG. 5 that the current operation rate of the processor of a controller CTL1 in a storage apparatus SYS1 is 40% (see 33150), that when the operation rate of the controller CTL1 exceeds 20% (see 33160), the management server 30000 determines that the controller CTL1 is overloaded, and that this performance value is thus determined as an abnormal value in the present example (see 33180).

Note that the I/O amount per unit time, the operation rate, and the response time are listed as examples of the performance values of the device managed by the management server 30000 but the other performance value managed by the management server 30000 may also be used.

<Configuration of Volume Topology Management Table>

FIG. 6 shows a configuration example of the volume topology management table 33200 provided in the management server 30000.

The volume topology management table 33200 includes, as configuration items, a field 33210 for registering an apparatus ID used as an identifier of a storage apparatus, a field 33220 for registering a volume ID used as an identifier of a volume provided in the storage apparatus, a field 33230 for registering an LU (Logical Unit) number used as an identifier of the LU used by the host computer 10000, a field 33240 for registering an ID of a controller used in the case where communication is performed between the port and the volume, a field 33250 for registering an identifier of the host computer 10000 connected to the volume, and a field 33260 for registering a drive name of a logical volume of the host computer 10000, by which name the volume is recognized as an actual device.

For example, it can be seen from the first row (first entry) of FIG. 6 that a volume VOL1 of the storage apparatus SYS1 is connected, as a logical unit designated as LU1, to a host computer HOST1 via the storage side controller designated by CTL1, so as to be recognized as a logical volume (/var) on the host.

<Configuration of Event Management Table>

FIG. 7 shows a configuration example of the event management table 33300 provided in the management server 30000. This event management table 33300 is suitably referred to in the fault cause analysis processing, and the cause candidate classification processing, each of which will be described below.

The event management table 33300 includes, as configuration items, a field 33310 for registering an event ID used as an identifier of an event itself, a field 33320 for registering an apparatus ID used as an identifier of an apparatus in which an event, such as a threshold-based abnormality, is generated in the acquired performance value, a field 33330 for registering an identifier of the portion of the apparatus in which an event is generated, a field 33340 for registering the metric name in relation to which the threshold-based abnormality is detected, a field 33350 for registering the OS type of the apparatus in which the threshold-based abnormality is detected, a field 33360 for registering the state of the portion in the apparatus at the time of generation of the event, a field 33370 for registering whether the event has been analyzed by the event analysis processing module 32500 as will be described below, and a field 33380 for registering the date and time of generation of the event.

For example, it can be seen from the first row (first entry) of FIG. 7 that, in the controller designated by CTL1 and included in the storage apparatus SYS1, the management server 30000 detects a threshold-based abnormality which is related to the processor operation rate and has the event ID of EV1.

<Configuration of General Rule>

FIG. 8A and FIG. 8B show configuration examples of general-purpose rules in the general-purpose rule repository 33400 provided in the management server 30000. The general-purpose rule (also similarly to the expanded rule as will be described below) represents a relationship of a combination of one or more condition events capable of occurring in a node apparatus configuring the computer system 1, with a conclusion event set as the fault cause corresponding to the combination of the condition events. That is, the general-purpose rule and the expanded rule as will be described below represent that, when the event in the condition portion is generated, the contents described in the conclusion portion may become a fault cause.

Generally, an event propagation model for specifying a cause in the fault analysis is configured such that a combination of events estimated to be generated due to a fault and a cause of the fault are described in an "IF-THEN" form. Note that the general-purpose rules are not limited to those as listed in FIG. 8A and FIG. 8B, but more other rules may be used.

The general-purpose rule includes, as configuration items, a field 33430 for registering a general-purpose ID used as an identifier of the general-purpose rule, a field 33410 which corresponds to the IF portion of the general-purpose rule described in the "IF-THEN" form and in which observation events are registered, a field 33420 which corresponds to the THEN portion of the general-purpose rule described in the "IF-THEN" form and in which a cause event is registered, and a field 33440 for registering a topology which is acquired at the time when the general-purpose rule is expanded to an actual system to generate an expanded rule. The general-purpose rule is based on the relationship that, when the events of the condition portion 33410 are detected, the event of the conclusion portion 33420 is the cause of the fault, and that, when the state of the conclusion portion 33420 becomes normal, the problem of the condition portion 33410 is also solved. In the examples shown in FIG. 8A and FIG. 8B, three events are described in the condition portion 33410, but there is no restriction in the number of events.

For example, it can be seen from FIG. 8A that, when a threshold-based abnormality related to the response time of the logical volume on the host computer (related event), and a threshold-based abnormality related to the operation rate (processor use rate) of the controller in the storage apparatus (cause event), and a threshold-based abnormality related to the I/O amount per unit time of the LU in the storage apparatus (related event) are detected as observation events, the general-purpose rule designated by the general-purpose rule ID of Rule 1 concludes that the bottleneck of the operation rate (processor use rate) of the controller in the storage apparatus is the cause of the fault.

Note that when the expanded rule is generated, topology information is acquired from the volume topology management table. Further, a state, in which a certain condition is normal, may also be defined as an event included in the observation events. In the general-purpose rule shown in FIG. 8B, a state in which the processor use rate of the controller in the storage apparatus, and the I/O amount per unit time of the LU in the storage apparatus are normal is defined as an observation event.

<Configuration of Expanded Rule>

FIG. 9A to FIG. 9H show configuration examples of expanded rules in the expanded rule repository 33500 provided in the management server 30000. These expanded rules are generated by inserting the item of each of the entries in the volume topology management table (FIG. 6) into the general-purpose rule (FIG. 8A and FIG. 8B).

The expanded rule includes, as configuration items, a field 33530 for registering an expanded rule ID used as an identifier of the expanded rule, a field 33540 for registering a general-purpose rule ID used as an identifier of the general-purpose rule on which the expanded rule is based, a field 33510 for registering an observation event, which corresponds to the IF portion of the expanded rule described in the "IF-THEN" form, and a field 33520 for registering a cause event, which corresponds to the THEN portion of the expanded rule described in the "IF-THEN" form.

For example, the expanded rule shown in FIG. 9A is generated by respectively inserting the controller name 32240, the host ID 32250, the connection destination drive name 32260, and the LU number 33230 of the first entry shown in FIG. 6 into the apparatus type and the type of the apparatus portion in the general-purpose rule designated by the general-purpose rule ID of Rule 1. Further, it can be seed from FIG. 9A that the expanded rule designated by the expanded rule ID of ExRule1-1 is expanded on the basis of the general-purpose rule designated by the general-purpose rule ID of Rule1, and that when a threshold-based abnormality related to the response time of the logical volume on the host computer, a threshold-based abnormality related to the operation rate (processor use rate) of the controller in the storage apparatus, and a threshold-based abnormality related to the I/O amount per unit time of LU in the storage apparatus are detected, the bottleneck of the operation rate (processor use rate) of the controller in the storage apparatus is concluded as the cause of the fault.

<Configuration of Analysis Result Management Table>

FIG. 10 shows a configuration example of the analysis result management table 33600 provided in the management server 30000.

The analysis result management table 33600 includes, as configuration items, a field 33610 for registering an apparatus ID used as an identifier of an apparatus in which an event determined as a cause of a fault in the fault cause analysis processing is generated, a field 33620 for registering an identifier of a portion in the apparatus, in which portion the event is generated, a field 33630 for registering the name of a metric in relation to which the threshold-based abnormality is detected, a field 33640 for registering the generation rate of the event described in the condition portion of the expanded rule, a field 33650 for registering the ID of the expanded rule on the basis of which the event is determined as the cause of the fault, a field 33660 for registering the ID of the actually received event among the events described in the condition portion of the expanded rule, a field 33670 for registering the result of determination whether the fault has been handled by the manager, as the user, based on the analysis result, a field 33680 for registering the classified group ID, a field 33690 for registering that the analysis result is used as the start of the classification at the time of performing the classification, and a field 33695 for registering the date and time of the start of the fault analysis processing according to the generation of the event.

For example, it can be seen from the first row (first entry) of FIG. 10 that on the basis of the expanded rule ExRule1-1, the management server 30000 has determined, as the cause of the fault, the threshold-based abnormality related to the processor operation rate of the controller designated by CTL1 in the storage apparatus SYS1, and has received, as the basis of the determination, the events of the event IDs respectively designated as EV1, EV3 and EV6, that is, the generation rate of the condition events is 3/3.

<Acquisition Processing of Configuration Management Information, and Update Processing of Volume Topology Management Table>

The program control module 32100 instructs, for example by polling processing, the configuration management information acquisition module 32200 to periodically acquire configuration management information from the storage apparatus 20000, the host computer 10000, and the IP switch 40000 in the computer system 1.

The configuration management information acquisition module 32200 acquires the configuration management information from the storage apparatus 20000, the host computer 10000, and the IP switch 40000, and also updates the volume topology management table 33200.

<Apparatus Performance Information Acquisition Processing and Event Analysis Processing>

Figure 11:
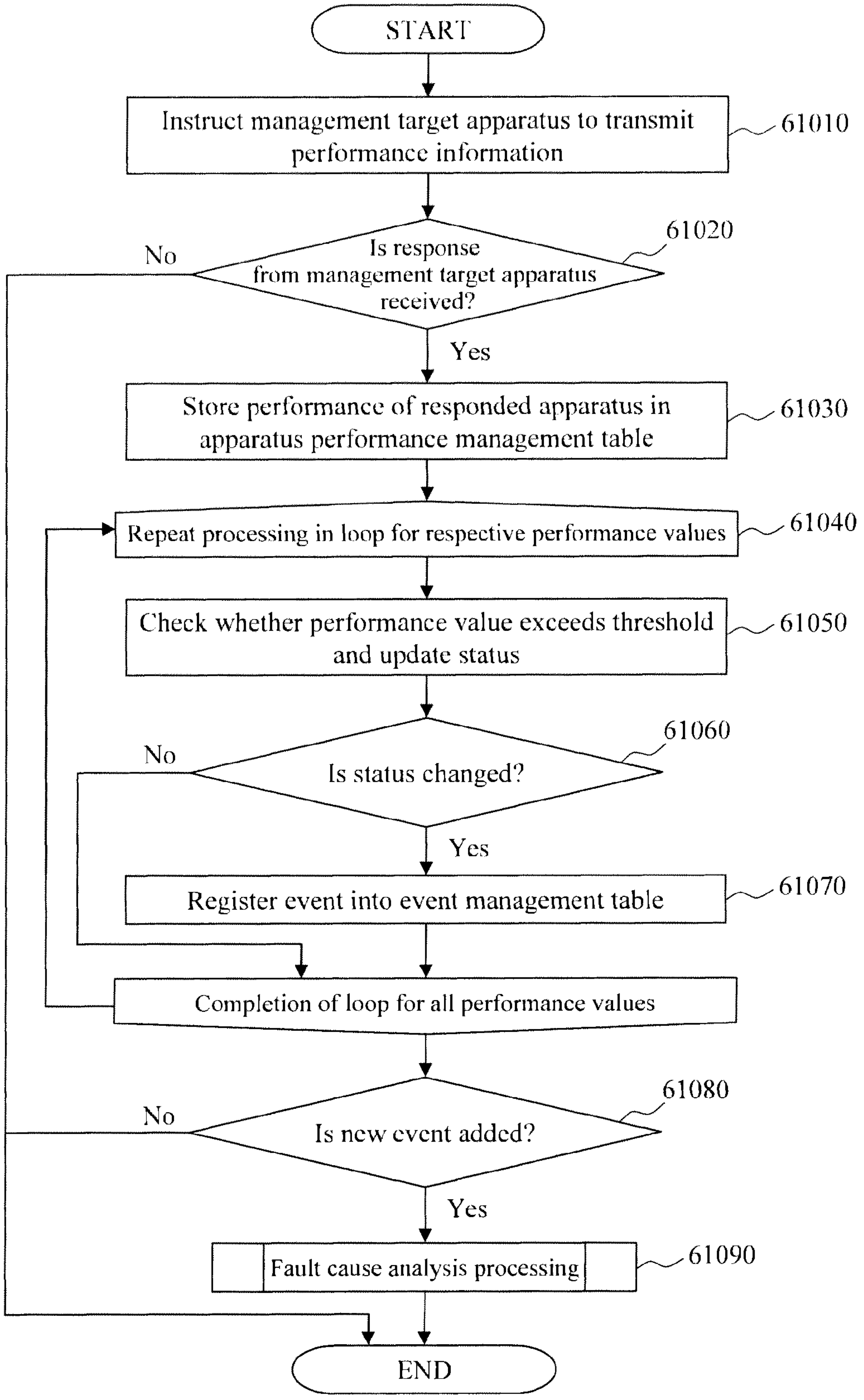
FIG. 11 is a flow chart for explaining the outline of performance information acquisition processing performed by the management server.

FIG. 11 is a flow chart for explaining normal apparatus performance information acquisition processing performed by the apparatus performance acquisition module 32300 of the management server 30000. The program control module 32100 instructs the apparatus performance acquisition module 32300 to perform apparatus performance information acquisition processing at the time of starting the program or each time a fixed time elapses from the last apparatus performance information acquisition processing. Note that when the instruction to perform the processing is repeatedly issued, the instruction need not be strictly periodically issued, but may only be repeatedly issued.

The apparatus performance acquisition module 32300 repeatedly performs the following series of processing to each monitoring target apparatus.

First, the apparatus performance acquisition module 32300 instructs each monitoring target apparatus to transmit configuration management information (step 61010).

The apparatus performance acquisition module 32300 determines whether there is a response from the monitoring target apparatus (step 61020). When there is a response of apparatus performance information from the monitoring target apparatus ("Yes" in step 61020), the apparatus performance acquisition module 32300 stores the acquired apparatus performance information in the apparatus performance management table 33100 (step 61030). When there is no response of configuration management information from the monitoring target apparatus ("No" in step 61020), the apparatus performance acquisition module 32300 ends the configuration management information acquisition processing.

Next, with reference to the apparatus performance information stored in the apparatus performance management table 33100, the apparatus performance acquisition module 32300 repeats the processing from step 61050 to step 61070 for each of the performance values (step 61040). The apparatus performance acquisition module 32300 checks whether or not the performance value exceeds the threshold, and updates the state registered in the apparatus performance management table 33100 (step 61050). Then, the apparatus performance acquisition module 32300 determines whether the state is changed from a normal state to a threshold-based abnormal state, or whether the state is changed from a threshold-based abnormal state to a normal state (step 61060). When the state is changed ("Yes" in step 61060), the apparatus performance acquisition module 32300 registers the event in the event management table 33300 (step 61070). When the state is not changed ("No" in step 61060), and when the state check processing for all the performance values is not completed, the apparatus performance acquisition module 32300 returns to the processing in step 61050.

After completing the above described processing for all the performance values, the apparatus performance acquisition module 32300 determines whether there is a newly added event during the series of the processing (step 61080). When there is a newly added event (for example, when a new abnormality is generated during the processing), the program control module 32100 instructs the event analysis processing module 32500 to perform the fault cause analysis processing shown in FIG. 12 (step 61090).

The above is the apparatus performance information acquisition processing which is performed by the apparatus performance acquisition module 32300.

<Details of Fault Analysis Processing (Step 61090)>

Figure 12:
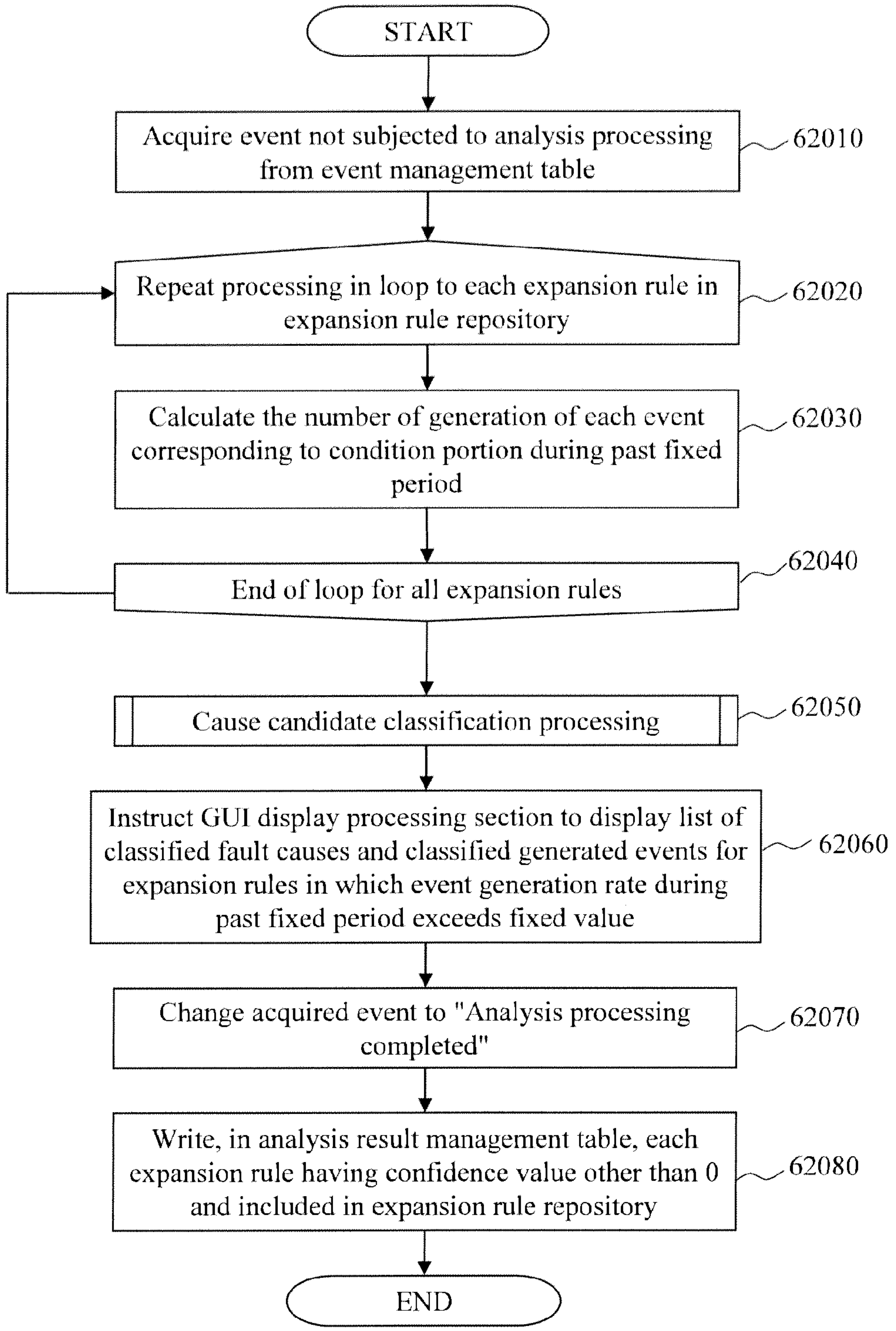
FIG. 12 is a flow chart for explaining fault analysis processing performed by the management server.

FIG. 12 is a flow chart for explaining the details of the fault cause analysis processing (step 61090 of FIG. 11) which is performed by the event analysis processing module 32500 of the management server 30000.

The event analysis processing module 32500 acquires, from event management table 33300, an event whose analysis completion flag is not set to "Yes" (step 62010).

Next, the event analysis processing module 32500 repeatedly performs the processing from step 62020 to step 62040 to each of the expanded rules in the expanded rule repository 33500 (step 62020). Then, the event analysis processing module 32500 first calculates the number of events each of which corresponds to the condition portion described in the expanded rule and which were generated in the past fixed time period (step 62030).

Subsequently, the event analysis processing module 32500 performs cause candidate classification processing (FIG. 13) (step 62050). Then, the event analysis processing module 32500 determines whether the number of event generation collected in the processing of step 62030 exceeds a fixed rate for each of the events described in the condition portion. When determining that the number of event generation exceeds the fixed rate, the event analysis processing module 32500 instructs the GUI display processing module 32400 to display an event estimated as the cause of the fault together with the generation rate of the events in the condition sentence according to the classification performed in step 62050 (step 62060). Thereafter, with reference to the event management table 33300, the event analysis processing module 32500 set the analysis completion flag 33370 of the event acquired in step 62010 to "Yes" (step 62070).

Finally, the event analysis processing module 32500 writes, in the analysis result management table 33600, each of the expanded rules which are included in the expanded rule repository and which has a confidence value not equal to 0 (step 62080).

For example, the condition portion of the expanded rule ExRule1-1 shown in FIG. 9A, a "threshold-based abnormality related to the response time of the logical volume (/var) in the host computer HOST1", a "threshold-based abnormality related to the operation rate of the controller CTL1 in the storage apparatus SYS1", and a "threshold-based abnormality related to the I/O amount per unit time of the logical unit LU1 in the storage apparatus SYS1" are defined.

When the "threshold-based abnormality related to the operation rate of the controller CTL1 in the storage apparatus SYS1" (generation date and time: 2010-01-01 15:05:00) is registered in the event management table 33300 shown in FIG. 7, the event analysis processing module 32500 stands by for a fixed time period, and then acquires the events generated in the past fixed time period with reference to the event management table 33300.

Next, the event analysis processing module 32500 calculates the number of generation of each of the events which correspond to the condition portion described in the expanded rule ExRule1-1 in the expanded rule repository 33500 and which were generated in the past fixed time period. As a result, the "threshold-based abnormality related to the response time of the logical volume (/var) in the host computer HOST1" (related event), and the "threshold-based abnormality related to the I/O amount per unit time of the logical unit LU1" (related event) have also been generated in the past fixed time period. Thus, the ratio of the number of generation of the events (cause event and related event), which are described in the condition portion of the expanded rule ExRule1-1 and which were generated in the past fixed period, with respect to the total number of events described in the condition portion becomes 3/3.

When the ratio calculated as described above exceeds a fixed value, the event analysis processing module 32500 instructs the GUI display processing module 32400 to display the event described as the fault cause, together with the generation rate of the events described in the condition sentence. When the fixed value here is set to, for example, 30%, the generation rate of the events described in the condition portion of the expanded rule ExRule1-1 during the past fixed time period is 3/3, that is, 100% in this specific example, and hence the analysis result is displayed in the GUI.

The above described processing is performed to all the expanded rules defined in the expanded rule repository 33500.

The above is the fault cause analysis processing performed by the event analysis processing module 32500. As described above, in the fault analysis function described in Patent Literature 1, when a plurality of faults frequently occur during a short period of time, the number of the fault analysis results to be stored is increased. However, when many cause candidates are inferred for the plurality of faults, there is no method for presenting which of the cause candidates relates to which of the faults is actually generated. Particularly when many fault events are generated and thereby many fault cause candidates are inferred, it is difficult for the manager to infer that which location of the fault can be solved immediately after which of the fault cause candidates is handled. Thus, it takes a long time until the manager refers to the analysis result representing the cause candidate to be preferentially handled. As a result, there is a problem that the time required to eliminate the fault is increased.

Thus, in the embodiment according to the present invention, cause candidate classification processing is newly provided in order to classify many analysis results and to display the classified result.

<Contents of Cause Candidate Classification Processing>

In order to solve the problem in the prior art, the cause candidate classification processing is additionally provided in the management server 30000 according to a first embodiment of the present invention. In the following, the details of the operation in the cause candidate classification processing will be described.

The cause candidate classification processing is processing which is based on an event included in a cause candidate (for example, cause candidate with a highest confidence value) serving as a starting point for classification, and in which, when there is the other cause candidate including the event, the other cause candidate and the classification start-point cause candidate are inferred to correspond to the same fault cause, so as to be classified (grouped) into a group. Since the cause candidates related to each other are classified into a group by the cause candidate classification processing, it is possible to know the cause candidate to be preferentially handled.

Figure 13:
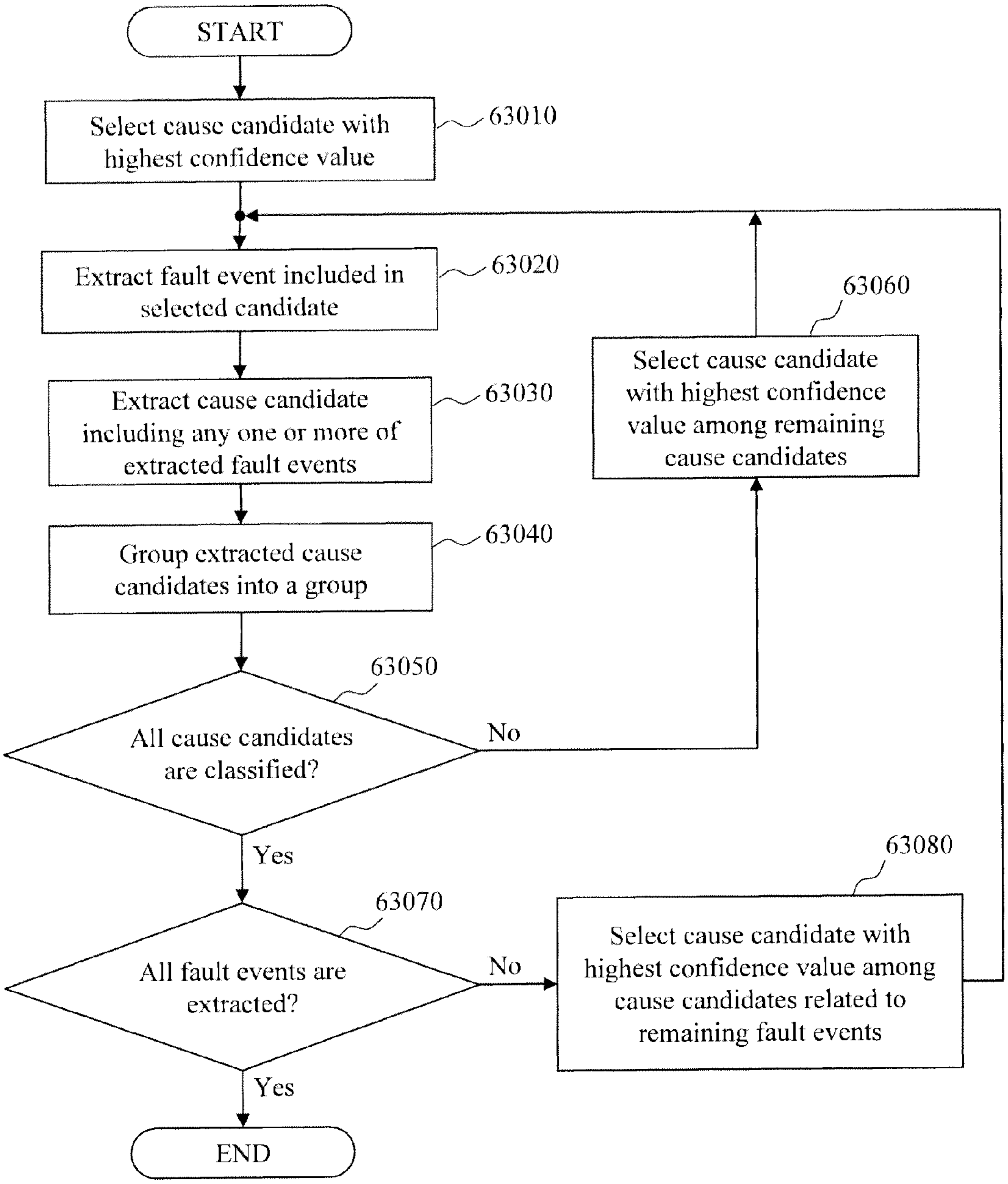
FIG. 13 is a flow chart for explaining cause candidate classification processing performed by the management server.

FIG. 13 is a flow chart for explaining the details of the cause candidate classification processing (step 62050) which is performed by the event analysis processing module 32500 of the management server 30000 in the first embodiment.

The event analysis processing module 32500 selects a cause candidate with a highest confidence value from the analysis result management table 33600 during a fixed time period (for example, one polling period) (step 63010). The event analysis processing module 32500 then registers "Yes" in the classification start-point flag field 33690 of the entry of the selected cause candidate in the analysis result management table 33600. The event analysis processing module 32500 acquires the reception event IDs included in the selected cause candidate from the analysis result management table 33600 (step 63020). Then, from the analysis result management table 33600, the event analysis processing module 32500 acquires the cause candidates each of which includes any one or more of the same reception event IDs as the acquired reception event IDs (step 63030). After the acquisition of the cause candidates, the event analysis processing module 32500 acquires a list of used group IDs from the group ID registration field 33680 of the analysis result management table 33600. Then, the event analysis processing module 32500 creates a group ID different from the used group IDs, and updates the contents of the field 33680 of the entries of the cause candidates acquired in step 63010 and step 63030, with the created group ID (step 63040).

Next, the event analysis processing module 32500 checks whether the analysis result management table 33600 includes the entry with the field 33680 in which the group ID is not written. When such entries exist (in the case of "No" in step 63050), the event analysis processing module 32500 selects the cause candidate with the highest confidence value from such entries (step 63060), and registers "Yes" in the classification start-point flag field 33690 of the selected entry of the cause candidate in the analysis result management table 33600. Then, the event analysis processing module 32500 again performs the processing in and subsequent to step 63020 to the selected cause candidate.

When with reference to the field 33680 of the analysis result management table 33600, the event analysis processing module 32500 confirms that the group IDs are described in all the entries (in the case of "Yes" in step 63050), the event analysis processing module 32500 acquires all the reception event IDs from the reception event ID field 33660 of the analysis result management table 33600. Next, the event analysis processing module 32500 acquires the entries with "Yes" in the classification start-point flag field 33690 of the analysis result management table 33600, and checks whether all the reception event IDs are included in the acquired entries.

When there exist one or more reception IDs which are not included in the acquired entries (in the case of "No" in step 63070), the event analysis processing module 32500 selects the cause candidate with the highest confidence value from the entries of the cause candidates including these reception IDs (step 63080), and registers "Yes" in the classification start-point flag field 33690 of the entry of the selected cause candidate in the analysis result management table 33600. Then, the event analysis processing module 32500 again performs the processing in and subsequent to step 63020 to the selected cause candidate.

When the entries with "Yes" in the classification start-point flag field 33690 of the analysis result management table 33600 are acquired, and when all the reception event IDs are included in the acquired entries (in the case "Yes" in step 63070), the cause candidate classification processing is ended.

The above is the cause candidate classification processing performed by the event analysis processing module 32500.

In the following, a specific example of the cause candidate classification processing will be described. Note that it is assumed that the analysis result management table, the expanded rule, and the event management table are respectively set as shown in FIG. 10, FIG. 9 and FIG. 7 at the start of the cause candidate classification processing. It is also assumed that the processing just before step 62050 in FIG. 12 is completed.

The event analysis processing module 32500 selects, as the entry with the highest confidence value, the entry of the fault cause candidate CTL1 of the apparatus SYS1 from the first row (first entry) of the analysis result management table 33600. Next, the event analysis processing module 32500 extracts EV1, EV3 and EV6 which are the fault events included in this candidate. Then, the event analysis processing module 32500 selects the second row entry (SYS1/CTL2) and the fifth row entry (IPSW1) as the other fault cause candidates including any one or more of these fault events. Then, the event analysis processing module 32500 groups these three entries into a group to generate a group ID of GR1, and registers the generated group ID in the group ID registration field 33680 of these entries in the analysis result management table. Further, since the first row entry is used as the reference for the classification, the event analysis processing module 32500 registers "Yes" in the classification start-point flag 33690 of the first row entry, and registers "No" in the classification start-point flag 33690 of the other two entries.

Since the remaining ungrouped entries (third row, fourth row) still exist in the analysis result management table, the event analysis processing module 32500 repeats the above grouping processing for the remaining entries. First, the event analysis processing module 32500 selects the third row entry (SYS1/CTL3) as an entry with a higher confidence value. Then, the event analysis processing module 32500 extracts EV2, EV4 and EV8 which are included in this fault cause candidate. The event analysis processing module 32500 selects the fifth row entry (IPSW1) as the other fault cause candidate including any one or more of these fault events. Then, the event analysis processing module 32500 groups these two entries into a group to generate a group ID of GR2, and registers the generated group ID in the group ID registration field 33680 of these entries in the analysis result management table. Note that although a group ID is already registered in the fifth row entry, the generated group ID is additionally registered to indicate that this entry belongs to a plurality of groups. For this reason, the group ID registration field 33680 is configured such that a plurality of group IDs can be registered therein. Further, since the third row entry is used as the reference for the classification, "Yes" is recorded in the classification start-point flag 33690 of the third row entry.

Further, the remaining ungrouped entry (fourth row) still exists in the analysis result management table. The event analysis processing module 32500 performs the similar processing to this entry. Then, the event analysis processing module 32500 extracts EV5 and EV9 which are the fault events included in this fault cause candidate. The event analysis processing module 32500 selects the fifth row entry (IPSW1) as the other fault cause candidate including any one or more of these fault events. Then, the event analysis processing module 32500 groups these two entries into a group to generate a group ID of GR3, and registers the generated group ID in the group ID registration field 33680 of these entries in the analysis result management table. Note that group IDs are already registered in the fifth row entry, and hence the event analysis processing module 32500 additionally registers the generated group ID in the group ID registration field 33680. Further, since the fourth row entry is used as the reference for the classification, "Yes" is recorded in the classification start-point flag 33690 of the fourth row entry.

By the above described processing, all of the entries of the analysis result management table are grouped.

Next, the event analysis processing module 32500 extracts fault events which were not referred to at the time of grouping. From all the event IDs included in the reception event ID field 33660 of the analysis result management table 33600, the event analysis processing module 32500 extracts EV7 as the event which is not included in the entries with "Yes" in the classification start-point flag 33690. As cause candidates including EV7, the second row entry (SYS1/CTL2) and the fifth row entry (IPSW1) exist. The event analysis processing module 32500 performs the grouping by using, as the start point, the second row entry (SYS1/CTL2) with the higher confidence value, and thereby can groups the second row entry and the first row entry (SYS1/CTL1) into a group. Note that all of these entries are included in the group GR1 here. In the case of handling a fault by paying attention to GR1, even when the fault of SYS1/CTL1 is handled in order to solve the first row entry set as the starting point of GR1, there is a possibility that EV7 included in the second row entry cannot be solved. In the present embodiment, the event analysis processing module 32500 also generates a group starting from the second row entry (SYS1/CTL2) separately from GR1 so that all the faults can be recovered by handling one entry of each of the groups. Then, the event analysis processing module 32500 generates a group ID of GR4 and registers the generated group ID in the group ID registration field 33680 of these entries in the analysis result management table. Note that since the group IDs are already registered in each of the entries, the event analysis processing module 32500 additionally registers the generated group ID of GR4. Further, since the second row entry is used as the reference for the classification, the event analysis processing module 32500 records "Yes" in the classification start-point flag 33690 of the second row entry.

Thereby, all the event IDs included in the reception event ID field 33660 of the analysis result management table 33600 are included in the entries with "Yes" in the classification start-point flag 33690, and hence the event analysis processing module 32500 ends the cause candidate classification processing.

<Configuration of Fault Analysis Result Display Screen>

FIG. 14 is a figure which is displayed by the management server 30000 to the user (manager) and which shows a display example 71000 of the fault-analysis result display screen.

In the fault analysis result display screen 71000, the analysis results defined in the analysis result management table and having the same group ID are collectively displayed. In this case, the entry classified to be included in a plurality of groups is displayed in duplication in each of the plurality of groups. Further, in each of the groups, the cause candidate set as the start point in the grouping processing is displayed at the uppermost position of the group. Further, in each of the groups, the cause candidates other than the cause candidate set as the start point are displayed in the descending order of the confidence value from the position next to the uppermost position of the group.

Note that in the present embodiment, all the groups of cause candidates are displayed on the same screen. However, since the cause candidates need only to be displayed by being classified into groups, and hence each of the groups of cause candidates may be displayed by a different screen so as to be switched by selecting a tab, or the like.

With the above described fault analysis result display, the manager can know, for example, that it is highly possible that the fault cause can be efficiently eliminated when the cause candidates are handled in order from the uppermost cause candidate in each of the cause candidate groups displayed on the screen of the management server 30000.

<Modification>

When there are too many groups generated as a result of the above described classification processing, the checking of the fault classification result may, on the contrary, be made difficult by the grouping processing. Thus, when the number of groups generated by the classification processing is at least a predetermined number (which can be set by the manager), the processing may also be configured so as to automatically unify some of the groups of the classification results. In the processing in this case, it is first determined, for example, whether a fixed percentage or more of condition events included in a group of a certain classification result are included in the other group of the classification result. Then, when the fixed percentage or more of the condition events are included in the other group of the classification result, the cause candidates included in these groups are classified into a group. This is because, when a fixed percentage or more of condition events of a certain group are also included in the other group, it is highly possible that the fault events included in both the groups are generated due to a fault generated in the same apparatus, and that the fault cause candidates included in both the groups can be handled as a group with no problem.

<Effect of Cause Candidate Classification Processing>

As described above, in the first embodiment, the management software of the management server 30000 performs the fault cause analysis processing shown in FIG. 12, and then displays the inferred fault cause candidates by classifying the inferred fault cause candidates on the basis of the fault events related to the faults which are solved when the fault cause candidates are handled. With the classification method according to the first embodiment and the display form of the classification result, the fault cause candidates can be classified so that all of the faults can be recovered by handling one high-order entry of each of the groups. Conventionally, when the cause candidate classification processing is not performed, the contents of the list shown in FIG. 10 are displayed as they are as the inferred fault cause candidates. When the cause candidate classification processing is performed, the manager can easily determine which of the cause candidates is to be preferentially handled, so that the load required in checking the analysis result and handling the fault can be reduced.

Further, when the respective cause candidates are classified into groups so as to be displayed as shown in FIG. 14, the manager can verify the high-priority cause candidate (candidate to be preferentially handled) with sufficient balance, and hence the time required in handling the fault can be reduced.

(2) Second Embodiment

A second embodiment is configured such that, after the cause candidates are presented to the manager by the first embodiment, the cause candidate classification processing is again performed based on the fault handling procedure performed by the manager. The system configuration and the configuration of each of apparatuses are the same as those of the first embodiment, and hence the explanation thereof is omitted. The following description of the second embodiment will describe the processing which is performed based on the operation of the manager after the fault analysis results are displayed on the screen as shown in FIG. 14 by the first embodiment.

<Processing at the Time of Cause Candidate Management>

Figure 15:
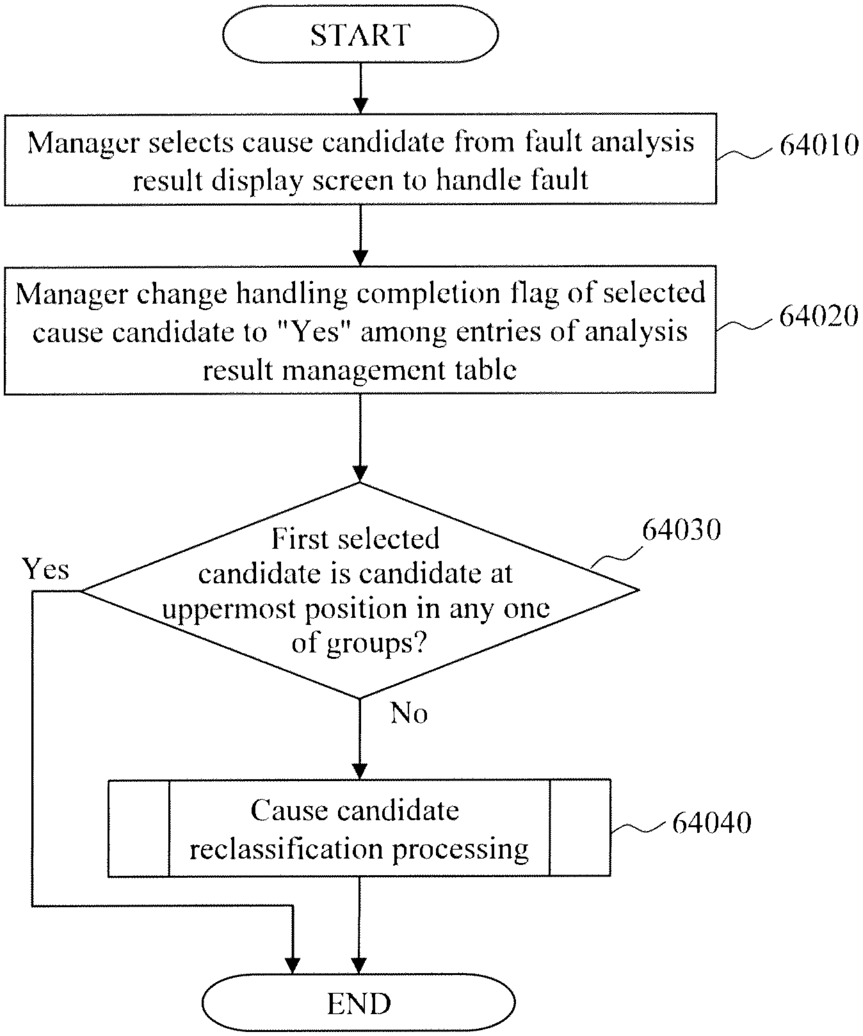
FIG. 15 is a flow chart for explaining processing performed by the management server at the time when a classified cause candidate is selected by the manager in the second embodiment.

FIG. 15 is a flow chart for explaining the processing of the second embodiment in the case where the manager performs fault handling by using the fault analysis result. When the event analysis processing module 32500 detects that the manager selects a cause candidate, for example, from the fault analysis result display screen 71000 to perform the fault handling (step 64010), the event analysis processing module 32500 changes the handling completion flag of the fault candidate selected by the manager into "Yes" (step 64020). In the first embodiment, the fault cause candidates are classified so that, when one high-order entry of each of the groups is handled, all the faults can be recovered. Therefore, when the fault candidate first selected by the manager at the time of handling the fault is the highest-order cause candidate of any of the groups, the classification has been performed so as to correspond to the intention of the manager and the actual configuration state. On the contrary, when the fault candidate selected by the manager is the fault candidate other than the highest-order fault candidate in any of the groups, the classification has not been properly performed. Therefore, when the fault candidate first selected by the manager is other than the highest-order fault candidate in any of the groups, the event analysis processing module 32500 performs cause candidate reclassification processing (step 64030 to step 64040). That is, the fact that a fault candidate other than the highest-order fault candidate is selected by the manager means that the result of the first classification is not trusted by the manager based on the manager's experience, and the like. Thus, the second embodiment is configured such that the reclassification of the fault cause candidates is performed to correspond to such situation and thereby the manager can more efficiently handle the cause candidates.

<Details of Cause Candidate Reclassification Processing>

Figure 16:
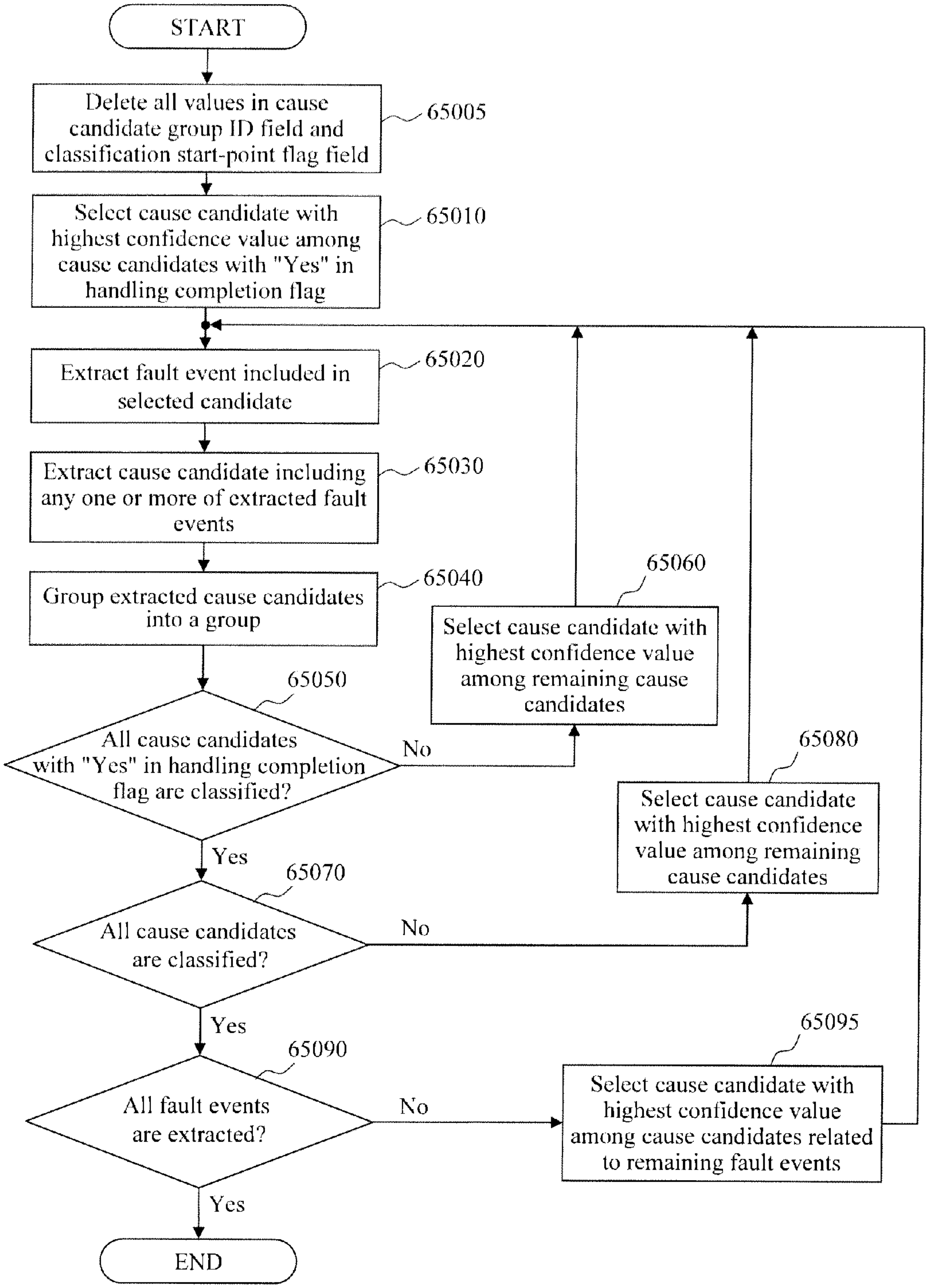
FIG. 16 is a flow chart for explaining cause candidate reclassification processing performed by the management server in the second embodiment.

FIG. 16 is a flow chart for explaining the details of the cause candidate reclassification processing (step 64040) according to the second embodiment. In the cause candidate reclassification processing according to the present embodiment, the classification processing equivalent to the cause candidate classification processing (step 63010 to step 63080) in the first embodiment is performed by preferentially starting from the fault cause candidate with the handling completion flag set to "Yes".

The event analysis processing module 32500 deletes, as pre-processing, the values of the group ID field 33680 and the classification start-point flag field 33690 of all the cause candidates (step 65005).

Next, the event analysis processing module 32500 selects the cause candidate with the highest confidence value among the cause candidates with "Yes" in the handling completion flag field 33670 in the analysis result management table 33600 (step 65010). Then, the event analysis processing module 32500 registers "Yes" in the classification start-point flag field 33690 of the entry of the selected cause candidate in the analysis result management table 33600.

The event analysis processing module 32500 acquires the reception event IDs included in the selected cause candidate from the analysis result management table 33600 (step 65020). Then, the event analysis processing module 32500 acquires, from the analysis result management table 33600, the cause candidates including any one or more of the same reception IDs as the acquired reception IDs (step 65030).

After the acquisition of the cause candidates, the event analysis processing module 32500 acquires the list of used group IDs from the group ID registration field 33680 in the analysis result management table 33600, and creates a group ID different from the group IDs included in the list. Then, the event analysis processing module 32500 updates, by the created group ID, the contents of the group ID registration field 33680 of the entries of the cause candidates selected in step 65010 and acquired in step 65030 (step 65040).

Subsequently, the event analysis processing module 32500 checks whether the entry with no description of the group ID in the field 33680 exists among the cause candidates with "Yes" in the handling completion flag field 33670 in the analysis result management table 33600. When such entries exist (in the case of "No" in step 65050), the event analysis processing module 32500 selects the cause candidate with the highest confidence value among such entries (step 65060), and registers "Yes" in the classification start-point flag field 33690 of the entry of the selected cause candidate in the analysis result management table 33600. Then, the event analysis processing module 32500 again performs processing in and subsequent to step 65020 to the selected candidate.

When determining that all the cause candidates with the handling completion flag set to "Yes" are classified (in the case of "Yes" in step 65050), the event analysis processing module 32500 checks whether the entry with no description of the group ID in the field 33680 exists in the analysis result management table 33600. When such entries exist (in the case of "No" in step 65070), the event analysis processing module 32500 selects the cause candidate with the highest confidence value from such entries (step 65080), and registers "Yes" in the classification start-point flag field 33690 of the entry of the selected cause candidate in the analysis result management table 33600. Then, the event analysis processing module 32500 again performs processing in and subsequent to step 65020 to the selected candidate.

When, with reference to the field 33680 of the analysis result management table 33600, the event analysis processing module 32500 determines that the group IDs are written in the field 33680 of all the entries (in the case of "Yes" in step 65070), the event analysis processing module 32500 acquires all the reception event IDs from the reception event ID field 33660 of the analysis result management table 33600.

Next, the event analysis processing module 32500 acquires the entries with "Yes" in the classification start-point flag field 33690 of the analysis result management table 33600, and checks whether all the reception event IDs are included in the acquired entries.

When there exist one or more reception IDs which are not included in the acquired entries (in the case of "No" in step 65090), the event analysis processing module 32500 selects the cause candidate with the highest confidence value from the entries of the cause candidates including those reception IDs (step 65095), and registers "Yes" in the classification start-point flag field 33690 of the entry of the selected cause candidate in the analysis result management table 33600. Then, the event analysis processing module 32500 again performs processing in and subsequent to step 65020 to the selected candidate.

The event analysis processing module 32500 acquires the entries with "Yes" in the classification start-point flag field 33690 of the analysis result management table 33600. Then, when all the reception event IDs are included in the acquired entries (in the case of "Yes" in step 65090), the event analysis processing module 32500 ends the cause candidate reclassification processing.

The above is the cause candidate reclassification processing which is performed by the event analysis processing module 32500. Note that the relationship between the timing of setting the handling completion flag to "Yes" and the timing of performing the cause candidate reclassification processing is not specified in FIG. 16. However, it may be configured such that, after some of the cause candidates are handled by the manager so that some of the handling completion flags are set to "Yes", the cause candidate reclassification processing (FIG. 16) is performed according to the instruction of the manager, or such that the cause candidate reclassification processing is performed each time when a handling completion flag is changed to "Yes".

In the following, specific examples of the cause candidate reclassification processing will be described. Note that it is assumed that, similarly to the first embodiment, the analysis result management table, the expanded rule, and the event management table are respectively set as shown in FIG. 10, FIG. 9, and FIG. 7 at the start of the processing. Note that it is assumed that the processing just before step 64040 in FIG. 15 is completed, during which processing the fault cause of IPSW1 in the fault analysis result display screen of FIG. 14 is first selected by the manager and "Yes" is recorded only in the handling completion flag field 33670 of the fifth row entry (IPSW1) in FIG. 10.

The event analysis processing module 32500 first deletes the values of the group ID field and the classification start-point flag field of all the cause candidates in the analysis result management table 33600. Next, from the cause candidates with "Yes" in the handling completion flag field in the analysis result management table 33600, the event analysis processing module 32500 selects, as the entry with the highest confidence value, the entry of the fault cause candidate of the IPSW apparatus, which entry is allocated to the fifth row (fifth entry) of the analysis result management table.

Next, the event analysis processing module 32500 extracts EV6, EV7, EV8 and EV9 which are the fault events included in this fault cause candidate. Then, the event analysis processing module 32500 selects, as the other fault cause candidates including any one or more of these fault events, the first row entry (SYS1/CTL1), the second row entry (SYS1/CTL2), the third row entry (SYS1/CTL3), and the fourth row entry (SYS1/CTL4). Then, the event analysis processing module 32500 groups these five entries into a group to generate a group ID of GR1, and registers the generated group ID in the group ID registration field 33680 of each of these entries in the analysis result management table. Further, since the fifth row entry is used as the reference for the classification, the event analysis processing module 32500 records "Yes" in the classification start-point flag 33690 of the fifth row entry and "No" in the classification start-point flag 33690 of the other four entries.

All the entries of the analysis result management table are grouped by the above described processing.

Subsequently, the event analysis processing module 32500 extracts the fault events which are not referred to in the grouping processing. From all the event IDs recorded in the reception event ID field 33660 of the analysis result management table 33600, the event analysis processing module 32500 extracts EV1, EV2, EV3, EV4 and EV5 as the event IDs which are not included in the entry with "Yes" in the classification start-point flag 33690. As the cause candidate including any one or more of the extracted event IDs, four entries of the first row entry to the fourth row entry exist. When similarly performing the grouping by setting, as the classification start point, the first row entry with the highest confidence value among these four entries, the event analysis processing module 32500 selects the second row entry (SYS1/CTL2) and the fifth row entry (IPSW1) as the other fault cause candidates including any one or more of the fault events EV1, EV3 and EV6. Then, the event analysis processing module 32500 groups these three entries into a group to generate a group ID of GR2, and registers the generated group ID in the group ID registration field 33680 of each of these entries in the analysis result management table. Further, since the first row entry is used as the reference for the classification, the event analysis processing module 32500 records "Yes" in the classification start-point flag 33690 of the first row entry.

From all the event IDs recorded in the reception event ID field 33660 of the analysis result management table 33600, the event analysis processing module 32500 extracts EV2, EV4 and EV5 as the event IDs which are not included in the entries with "Yes" in the classification start-point flag 33690. As the cause candidates including any one or more of these extracted fault events, two entries of the third row entry and the fourth row entry exist. When similarly performing the grouping by setting, as the classification start point, the third row entry with the higher confidence value between the these two entries, the event analysis processing module 32500 selects the fifth row entry (IPSW1) as the other fault cause candidate including any one or more of the fault events EV2, EV4 and EV8. Then, the event analysis processing module 32500 groups these two entries into a group to generate a group ID of GR3, and registers the generated group ID in the group ID registration field 33680 of each of these entries in the analysis result management table. Further, since the third row entry is used as the reference for the classification, the event analysis processing module 32500 records "Yes" in the classification start-point flag 33690 of the third row entry.

Further, from all the event IDs recorded in the reception event ID field 33660 of the analysis result management table 33600, the event analysis processing module 32500 extracts EV5 as the event ID which is not included in the entries with "Yes" in the classification start-point flag 33690. When similarly performing the grouping by setting, as the classification start point, the fourth row entry including the event ID, the event analysis processing module 32500 selects the fifth row entry (IPSW1) as the other fault cause candidates including any one or more of the fault events EV5 and EV9. Then, the event analysis processing module 32500 groups these two entries into a group to generate a group ID of GR4, and registers the generated group ID in the group ID registration field 33680 of each of these entries in the analysis result management table. Further, since the fourth row entry is used as the reference for the classification, the event analysis processing module 32500 records "Yes" in the classification start point flag 33690 of the fourth row entry.

Since all the event IDs, which are recorded in the reception event ID field 33660 of the analysis result management table 33600, are included in the entries with "Yes" in the classification start-point flag 33690, the event analysis processing module 32500 ends the cause candidate reclassification processing.

<Configuration of Fault Analysis Result Display Screen>

FIG. 17 shows a display example 72000 of a fault analysis result display screen which is displayed by the management server 30000 to the user (manager) after the cause candidate reclassification processing.

Similarly to the first embodiment, in the fault analysis result display screen 72000, the analysis results defined in the analysis result management table and having the same group ID are collectively displayed. In this case, the entry classified to be included in a plurality of groups is displayed in duplicate in the plurality of groups. Further, in each of the groups, the cause candidate set as the start point in the grouping processing is displayed at the uppermost position of the group. Further, in each of the groups, the cause candidates other than the cause candidate set as the start point are displayed in the descending order of the confidence value from the position next to the uppermost position of the group.

Note that, in the present embodiment, all the groups of the cause candidates are displayed on the same screen similarly to the first embodiment, but the cause candidates need only to be displayed by being classified into the groups. Thus, each of the groups of the cause candidates may be displayed on each of the different screens which are switched by selecting a tab, or the like.

<Effect of Cause Candidate Reclassification Processing>

As described above, according to the second embodiment, when as shown in FIG. 15, the manager first selects, as a fault cause, a fault cause candidate which is not displayed at the uppermost position of a group in the first embodiment, the management software of the management server 30000 again performs the classification of the fault cause candidates on the basis of the selected fault cause candidate. In the state as classified in the first embodiment (FIG. 14), the fault cause candidate IPSW1 displayed at the lowermost position of each of the groups is selected by the manager. This means that there may be an external state which is not grasped by the management software according to the present invention but is grasped by the manager, and which allows the manager to infer the fault cause candidate IPSW1 as the cause of the fault. In such case, the fault cause candidates are dynamically regrouped based on the fault cause candidate selected by the manager as shown in the second embodiment.

As a result, in the case where the fault cause generated in IPSW1 is first handled, the other fault causes to be preferentially handled are classified and displayed. For this reason, even if the classification result presented in the first embodiment is different from the intention of the manager, the classification can be corrected according to the intention of the manager, and hence the manager's load required in handling the fault can be reduced.

(3) Summary

In the fault cause analysis, after the fault cause inference in the management server, fault events applied to the analysis rule in the process of deriving each of the inferred fault cause candidates are obtained for each of the fault cause candidates. Then, the fault cause candidates are classified based on the confidence value of each of the fault cause candidates and the fault events used as the basis to derive the confidence value. However, when a plurality of faults due to different causes frequently occur in a short period, the number of the fault analysis results stored in the management server is increased. Thereby, in some cases, the manager cannot determine that which of the fault cause candidates is inferred in association with which of the faults is actually generated. In such a case, according to the present invention, the fault cause candidates, each of which commonly includes any one or more of actually generated fault events, are classified into the same group. Thereby, even when a plurality of faults occur due to different causes, the cause candidates can be classified into groups each of which has a proper combination of the cause candidates.

Note that, when the fault event relating to only one cause candidate exists, the cause candidate must be used to solve the fault causing the fault event. In such case, a plurality of cause candidates do not relate to the fault event, and hence there exists no group which is classified based on the fault event. Therefore, there is a case where this fault event cannot be solved even when the fault cause candidates of all the groups are handled. In particular, when the only cause candidate enabling the fault event to be solved is unexpectedly classified into a group due to a certain other fault event, the cause candidate is identified with many other cause candidates in the group in spite of the fact that the cause candidate is the only cause candidate enabling the specific fault event to be solved. As a result, it can also be considered that the fault event is not promptly handled due to such classification. In order to prevent such case, in the present invention, when there exists a fault event which is not used as the basis of the fault cause candidate classification, another group of the cause candidates to solve the fault event is further created. That is, the management server changes the start-point cause candidate, and repeats the classification processing of the conclusion events. After the classification of the conclusion events set as all the fault causes, when the conclusion event (for example, the second row entry in FIG. 10) other than the conclusion events selected as the start-point cause candidates includes a remaining condition event which is a condition event other than the condition events included in the conclusion events selected as the start-point cause candidates, the classification processing is further performed by using, as a start-point cause candidate, the conclusion event including the remaining condition event. Thereby, all the cause candidates can be classified into groups, and all the faults can be recovered.

Further, in the present invention, the management server displays the fault analysis result based on the classification result. In this case, the management server displays the classification result so that the manager can understand which of the other fault cause candidates are grouped with each of the cause candidates. For example, based on the classification result, each group of the cause candidates may be displayed on each different screen, and the cause candidates may also be displayed so that each of the groups can be recognized on the same screen by changing the order of the cause candidates in each of the groups. Further, after the cause candidates are displayed similarly on the same screen in the order unrelated to the group based on the confidence value, or the like, the group, to which each of the cause candidates belongs, may also be displayed in each of the cause candidate entries.

In the present embodiment, abnormal states are detected from the performance value of each of the node apparatuses, and fault cause candidates are presented as the analysis result of the abnormal states (calculation result of the confidence values of the abnormal states) to the manager. In this case, a case where events representing some abnormal states are caused by an event of a certain specific abnormal state is assumed, and fault cause candidates including the abnormal state common to the fault cause with the highest confidence value are classified. Then, on the fault analysis result display screen, the analysis result is displayed in such a manner that the manager can understand the classification. More specifically, in the computer system according to the present embodiment, the management server (management system) acquires processing performance values representing the processing performance of a node apparatus, so as to detect the occurrence of a fault in the node apparatus from the acquired processing performance values. Then, the management server selects, as a start-point cause candidate, one of the conclusion events which is set as a plurality of fault causes, and extracts the condition events related to the start-point cause candidate. Further, the management server selects, as a related cause candidate, a conclusion event which is related to the extracted condition events, and which is set as one or more fault causes different from the conclusion event of the start-point cause candidate. Further, the management server performs the classification processing of the conclusion event of the start-point cause candidate and the conclusion event of the related cause candidate separately from the other conclusion events. Then, the management server displays the classified conclusion events on a display screen. Thereby, the manager can easily determine the priority for handling the analysis result, and the manager's load required in checking the analysis result and handling the fault can be reduced.

Further, according to the result of classification of the conclusion events corresponding to the start-point cause candidate and the related cause candidates, the management server displays the conclusion events selected as the fault cause, on the display screen separately for each classification result. Thereby, the analysis result to be handled can be easily determined, and the analysis results already handled can be managed separately from the analysis results which are not handled.

Further, the management server classifies, into the same group as the conclusion event of the start-point cause candidate, the conclusion events of the related cause candidates, each of which includes, in the analysis rule, at least one of the same condition events as the condition events related to the conclusion event of the start-point cause candidate. Thereby, since the classification conditions are made clear, and since the cause candidates which can be simultaneously solved by handling the start-point cause candidate are classified into the same group, the manager's load can be reduced.

Note that a conclusion event with a highest confidence value may be selected as the start-point cause candidate. Thereby, the classification processing can be automatically performed based on the analysis result whose handling priority is considered to be high, and hence it is possible to efficiently handle the fault.

Further, the management server configured to perform the fault analysis is not necessarily able to completely grasp the external situation around the management target. Therefore, it cannot be denied that the fault cause presented by the classification results in the present embodiment is different from the event actually estimated as the fault cause by the manager. For this reason, the present embodiment is configured such that, when the manager selects the cause candidate with low priority (low confidence value) to make the fault recovery processing performed, the cause candidates are again dynamically classified into groups according to the selection by the manager (see the second embodiment). That is, the management server determines whether to perform the reclassification processing of the classification result including a plurality of classification groups, on the basis of the information about which position of the classification groups includes the conclusion event selected by the manager at the time of handling the fault. That is, the management server again performs the classification processing by using, as the start-point cause candidate, the conclusion event selected at the time of handling the fault. When the classification processing is again dynamically performed in this way, the manager can handle the fault based on the experience of the manager, and thereby can efficiently manage the computer system.

Note that the present invention can also be realized by a program code of software which realizes the functions of the embodiments. In this case, a storage medium, in which the program code is recorded, is provided in a system or an apparatus, and a computer (or CPU or MPU) of the system or the apparatus reads the program code stored in the storage medium. In this case, the program code itself read from the storage medium realizes the functions of the above described embodiments, and hence the program code itself and the storage medium storing the program code configure the present invention. For example, a flexible disk, a CD-ROM, a DVD-ROM, a hard disk, an optical disk, a magneto-optical disk, a CD-R, a magnetic tape, a nonvolatile memory card, a ROM, and the like, are used as storage media used to provide such program code.

Further, it may also be configured such that an OS (operating system), and the like, operating on the computer performs all of or a part of the actual processing on the basis of the instruction of the program code, so as to thereby realize the functions of the above described embodiments by the processing. Further, it may also be configured such that the program code read from the storage medium is written in a memory on the computer, and thereafter a CPU, or the like, of the computer performs a part of or all of the actual processing on the basis of the instruction of the program code, so as to thereby realize the functions of the above described embodiments by the processing.

Further, it may also be configured such that the program code of software which realizes the functions of the embodiments is distributed via a network, so as to be stored in storage means, such as a hard disk and a memory, of a system or an apparatus, or stored in a storage medium, such as a CD-RW and a CD-R, and such that a computer (or CPU or MPU) of the system or the apparatus reads, at the time of use, the program code stored in the storage means or the storage medium, and executes the program code.

REFERENCE SIGNS LIST

10000: Server
20000: Storage apparatus
30000: Management server
35000: WEB browser start server
40000: IP switch
45000: Network

The invention claimed is:

1. A management method of a computer system including one or more nodes to be monitored, and a management system which is coupled to the one or more nodes via a network and which monitors and manages the one or more nodes, wherein the management system performs the steps of:

acquiring a processing performance value representing processing performance of the one or more nodes to detect occurrence of a fault in the one or more nodes on the basis of the acquired processing performance value, applying the detected fault to an analysis rule representing a relationship of a combination of one or more condition events capable of occurring in the one or more nodes with a conclusion event set as a fault cause of the combination of the condition events, to calculate a confidence value which is the information representing the possibility of occurrence of the fault in the one or more nodes, selecting, as a start-point cause candidate, one of the conclusion events set as a plurality of fault causes, to extract the condition events related to the start-point cause candidate, selecting, as a related cause candidate, a conclusion event which relates to the extracted condition event, and which is set as one or more fault causes different from the conclusion event selected as the start-point cause candidate, and performing classification processing of the conclusion event selected as the start-point cause candidate, and the conclusion event of the related cause candidate separately from the other conclusion events, to display the classified conclusion events on a display screen.

2. The management method of the computer system according to claim 1, wherein according to the classification result of the conclusion events corresponding to the start-point cause candidate and the related cause candidate, the management system distinguishes and displays the conclusion events set as the fault causes, on the display screen for each classification result.

3. The management method of the computer system according to claim 1, wherein the management system classifies, into the same group as the conclusion event of the start-point cause candidate, the conclusion event of the related cause candidate including, in the analysis rule, at least one of the same condition events as the condition events related to the conclusion event of the start-point cause candidate.

4. The management method of the computer system according to claim 1, wherein the management system selects, as the start-point cause candidate, the conclusion event with the highest confidence value, and classifies the conclusion events of the related cause candidates on the basis of the condition events related to the conclusion event of the start-point cause candidate.

5. The management method of the computer system according to claim 1, wherein the management system performing the steps of: repeating the classification processing of the conclusion events set as the plurality of fault causes while changing the start-point cause candidate; determining, after the classification of the conclusion events set as all the fault causes, whether the conclusion event other than the conclusion event selected as the start-point cause candidate includes a remaining condition event which is the condition event other the condition event included in the conclusion event selected as the start-point cause candidate; and further performing classification processing by using, as the start-point cause candidate, the conclusion event including the remaining condition event.

6. The management method of the computer system according to claim 2, wherein the management system determines whether the classification processing of the classification result including the plurality of classification groups is again performed, on the basis of information about which position of the classification groups includes the conclusion event selected by the manager at the time of handling the fault.

7. The management method of the computer system according to claim 6, wherein the management system again performs the classification processing by using, as the start-point cause candidate, the conclusion event selected at the time of handling the fault.

8. A management system coupled to one or more nodes to be monitored via a network and configured to manage the one or more nodes, comprising:

a processor which acquires a processing performance value representing processing performance of the one or more nodes to detect the state of the one or more nodes on the basis of the acquired processing performance value; and a memory which stores an analysis rule representing a relationship of a combination of one or more condition events capable of occurring in the one or more nodes with a conclusion event set as a fault cause of the combination of the condition events, wherein the processor applies the detected state to the analysis rule to calculate a confidence value which is the information representing the possibility of occurrence of the fault in the one or more nodes;

wherein the processor selects, as a start-point cause candidate, one of the conclusion events set as a plurality of fault causes, to extract the condition events related to the start-point cause candidate;

wherein the processor selects, as a related cause candidate, a conclusion event which relates to the extracted condition events, and which is set as one or more fault causes different from the conclusion event of the start-point cause candidate; and wherein the processor performs classification processing of the conclusion event of the start-point cause candidate and the conclusion event of the related cause candidate separately from the other conclusion events, to display the classified conclusion events on a display screen.

9. The management system according to claim 8, wherein according to the classification result of the conclusion events corresponding to the start-point cause candidate and the related cause candidates, the processor distinguishes and displays the conclusion events set as the fault cause, on the display screen for each classification result.

10. The management system according to claim 8, wherein the processor classifies, into the same group as the conclusion event of the start-point cause candidate, the conclusion event of the related cause candidate including, in the analysis rule, at least one of the same condition events as the condition events related to the conclusion event of the start-point cause candidate.

11. The management system according to claim 8, wherein the processor selects, as the start-point cause candidate, the conclusion event with the highest confidence value, and classifies the conclusion events of the related cause candidates on the basis of the condition events related to the conclusion event of the start-point cause candidate.

12. The management system according to claim 8, wherein the processor repeats the classification processing of the conclusion events set as the plurality of fault causes while changing the start-point cause candidate, determines, after the classification of the conclusion events set as all the fault causes, whether the conclusion event other than the conclusion event selected as the start-point cause candidate includes a remaining condition event which is the condition event other the condition event included in the conclusion event selected as the start-point cause candidate; and further performs classification processing by using, as the start-point cause candidate, the conclusion event including the remaining condition event.

13. The management system according to claim 9, wherein the processor determines whether the classification processing of the classification result including the plurality of classification groups is again performed, on the basis of the information about which position of the classification groups includes the conclusion event selected by the manager at the time of handling the fault; and the processor performs, when determining that the classification processing is again performed, the classification processing by using, as the start-point cause candidate, the conclusion event selected at the time of handling the fault.

* * * * *